(12) United States Patent
Katsuragi et al.

(10) Patent No.: US 9,776,424 B2
(45) Date of Patent: Oct. 3, 2017

(54) IMAGE FORMING SET, IMAGE FORMING APPARATUS, AND IMAGE FORMING METHOD

(71) Applicants: Koji Katsuragi, Kanagawa (JP); Ken Hasegawa, Kanagawa (JP)

(72) Inventors: Koji Katsuragi, Kanagawa (JP); Ken Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/971,379

(22) Filed: Dec. 16, 2015

(65) Prior Publication Data

US 2016/0177116 A1 Jun. 23, 2016

(30) Foreign Application Priority Data

Dec. 22, 2014 (JP) ................. 2014-259059
Apr. 28, 2015 (JP) ................. 2015-091841

(51) Int. Cl.
*B41J 2/21* (2006.01)
*C09D 11/324* (2014.01)
(Continued)

(52) U.S. Cl.
CPC ......... *B41J 2/2107* (2013.01); *B41J 11/0015* (2013.01); *B41M 7/0036* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; B41J 2/1606; B41J 2/162; B41J 2/1634; B41J 2/1645; B41J 2202/03; C09D 183/06; C09D 183/08; B41M 5/0011; B41M 5/0017; B41M 7/00; B41M 7/0072; B41M 5/52; B41M 5/5218
(Continued)

(56) References Cited

U.S. PATENT DOCUMENTS 6,283,589 B1 * 9/2001 Gelbart ............... B41J 11/0015
347/100
8,382,271 B2 2/2013 Goto et al.
(Continued)

FOREIGN PATENT DOCUMENTS

JP 2006-089559 4/2006
JP 4525778 6/2010
(Continued)

*Primary Examiner* — Manish S Shah
(74) *Attorney, Agent, or Firm* — Oblon, McClelland, Maier, Neustadt, L.L.P.

(57) ABSTRACT

To provide an image forming set including: an aqueous ink including a colorant, a water-soluble organic solvent, and water; and a post-treatment liquid including a water-soluble organic solvent, water, and at least one of a urethane resin and an acrylic resin, wherein a solubility parameter of a mixed solution of the water-soluble organic solvent and the water in the post-treatment liquid is lower than a solubility parameter of a mixed solution of the water-soluble organic solvent and the water in the aqueous ink by 1.5 $(cal/cm^3)^{1/2}$ or greater.

20 Claims, 5 Drawing Sheets

(51) Int. Cl.

| | |
|---|---|
| *C09D 11/38* | (2014.01) |
| *C09D 175/08* | (2006.01) |
| *C09D 143/04* | (2006.01) |
| *B41J 11/00* | (2006.01) |
| *C08G 18/08* | (2006.01) |
| *C08G 18/10* | (2006.01) |
| *C08L 75/08* | (2006.01) |
| *C09D 11/10* | (2014.01) |
| *C09D 11/12* | (2006.01) |
| *C09D 11/40* | (2014.01) |
| *C09D 11/54* | (2014.01) |
| *B41M 7/00* | (2006.01) |
| *B41M 5/00* | (2006.01) |

(52) U.S. Cl.
CPC ......... *C08G 18/0819* (2013.01); *C08G 18/10* (2013.01); *C08L 75/08* (2013.01); *C09D 11/10* (2013.01); *C09D 11/12* (2013.01); *C09D 11/324* (2013.01); *C09D 11/38* (2013.01); *C09D 11/40* (2013.01); *C09D 11/54* (2013.01); *C09D 143/04* (2013.01); *C09D 175/08* (2013.01); *B41M 5/0011* (2013.01)

(58) Field of Classification Search
USPC .................................................. 347/95–105
See application file for complete search history.

(56) References Cited

U.S. PATENT DOCUMENTS

| | | | |
|---|---|---|---|
| 8,764,896 | B2 | 7/2014 | Katsuragi |
| 8,998,396 | B2 | 4/2015 | Katsuragi |
| 9,127,179 | B1 | 9/2015 | Hasegawa |
| 2004/0189772 | A1* | 9/2004 | Arai .......... B41J 3/543 347/102 |
| 2005/0190248 | A1* | 9/2005 | Konno ...................... B41J 2/155 347/102 |
| 2007/0076070 | A1 | 4/2007 | Makuta et al. |
| 2007/0146454 | A1* | 6/2007 | Doi .......... C09D 11/40 347/100 |
| 2008/0276833 | A1* | 11/2008 | Sasaki ...................... C09D 11/30 106/31.13 |
| 2009/0227728 | A1 | 9/2009 | Doi et al. |
| 2010/0040782 | A1 | 2/2010 | Arai et al. |
| 2010/0134729 | A1* | 6/2010 | Shibatani .............. C08F 220/36 349/106 |
| 2011/0205289 | A1* | 8/2011 | Irita ..................... C09D 11/101 347/21 |
| 2012/0128949 | A1* | 5/2012 | Goto ..................... B41J 2/2107 347/21 |
| 2013/0063524 | A1 | 3/2013 | Katoh et al. |
| 2013/0201252 | A1* | 8/2013 | Namba ................ B41J 11/0015 347/21 |
| 2013/0321524 | A1 | 12/2013 | Katsuragi |
| 2014/0125731 | A1 | 5/2014 | Katsuragi |
| 2014/0132662 | A1 | 5/2014 | Katsuragi |
| 2014/0141212 | A1* | 5/2014 | Fu .......................... B41J 11/002 347/102 |
| 2014/0192112 | A1 | 7/2014 | Nagashima et al. |
| 2015/0022582 | A1 | 1/2015 | Katsuragi |
| 2015/0022583 | A1 | 1/2015 | Katsuragi |
| 2015/0258833 | A1 | 9/2015 | Katsuragi |

FOREIGN PATENT DOCUMENTS

| | | |
|---|---|---|
| JP | 4864407 | 11/2011 |
| JP | 5398401 | 11/2013 |
| JP | 2014-131855 | 7/2014 |

* cited by examiner

IMAGE FORMING SET, IMAGE FORMING APPARATUS, AND IMAGE FORMING METHOD

BACKGROUND OF THE INVENTION

Field of the Invention

The present invention relates to an image forming set, an image forming apparatus, and an image forming method.

Description of the Related Art

It has been known in an inkjet recording system that a post-treatment liquid is applied onto a surface of an image formed by jetting an aqueous ink in order to improve glossiness of the image.

The post-treatment liquid is applied after fixing the image formed by jetting the aqueous ink. There is also a case where the post-treatment liquid is applied onto a surface of an image in an unfixed state, after jetting the aqueous ink to form the image.

The post-treatment liquid includes ingredients, such as a resin, and wax. As the resin, or the wax form a uniform coating film on the surface of the image formed by jetting the aqueous ink, glossiness is imparted to the image. If the post-treatment liquid is applied onto a surface of an image formed by ejecting the aqueous ink in the unfixed state, however, the post-treatment liquid is mixed into the image. Therefore, a uniform coating film cannot be formed on the surface of the image, leading to a problem that glossiness of the image is poor. Note that, the unfixed state means a state where an image formed by ejecting an aqueous ink is not dried, and the image is not adhered to a recording medium.

To solve the aforementioned problem, proposed for the purpose of realizing high-speed printing is a recording material that, in which a difference between a solubility parameter (may be referred to as "SP value" hereinafter) of a water-soluble organic solvent in an ink and an SP value of a monomer component in ink-receiving particles having excellent ink adsorption is less than 5, and the SP value of the water-soluble organic solvent in the ink is 17.5 or less (for example, see Japanese Patent (JP-B) No. 4525778).

Moreover, disclosed is an ink set having excellent maintenance properties of an aqueous ink, in which water is contained in an amount of 50% by mass or greater relative to a total mass, and a solvent is contained in an amount of 5% by mass or greater relative to the total mass, and 50% by mass or greater of the solvent has the SP value of 27.5 $(MPa)^{1/2}$ (13.4 $(cal/cm^3)^{1/2}$) or less (for example, see Japanese Patent (JP-B) No. 5398401).

SUMMARY OF THE INVENTION

The present invention aims to provide an image forming set, which gives glossiness to a resulting image.

As the means for solving the aforementioned problems, the image forming set of the present invention includes an aqueous ink including a colorant, a water-soluble organic solvent, and water, and a post-treatment liquid including a water-soluble organic solvent, water, and at least one of a urethane resin and an acrylic resin. A solubility parameter of a mixed solution of the water-soluble organic solvent and the water in the post-treatment liquid is lower than a solubility parameter of a mixed solution of the water-soluble organic solvent and the water in the aqueous ink by 1.5 $(cal/cm^3)^{1/2}$ or greater.

In the present invention, an organic solvent being water soluble means, for example, that the organic solvent and pure water do not present as two separate layers after being settled from currents, when the organic solvent and the pure water are gently mixed.

The present invention can solve the aforementioned various problems in the art, and can provide an image forming set, which gives glossiness to a resulting image.

Figure 1:
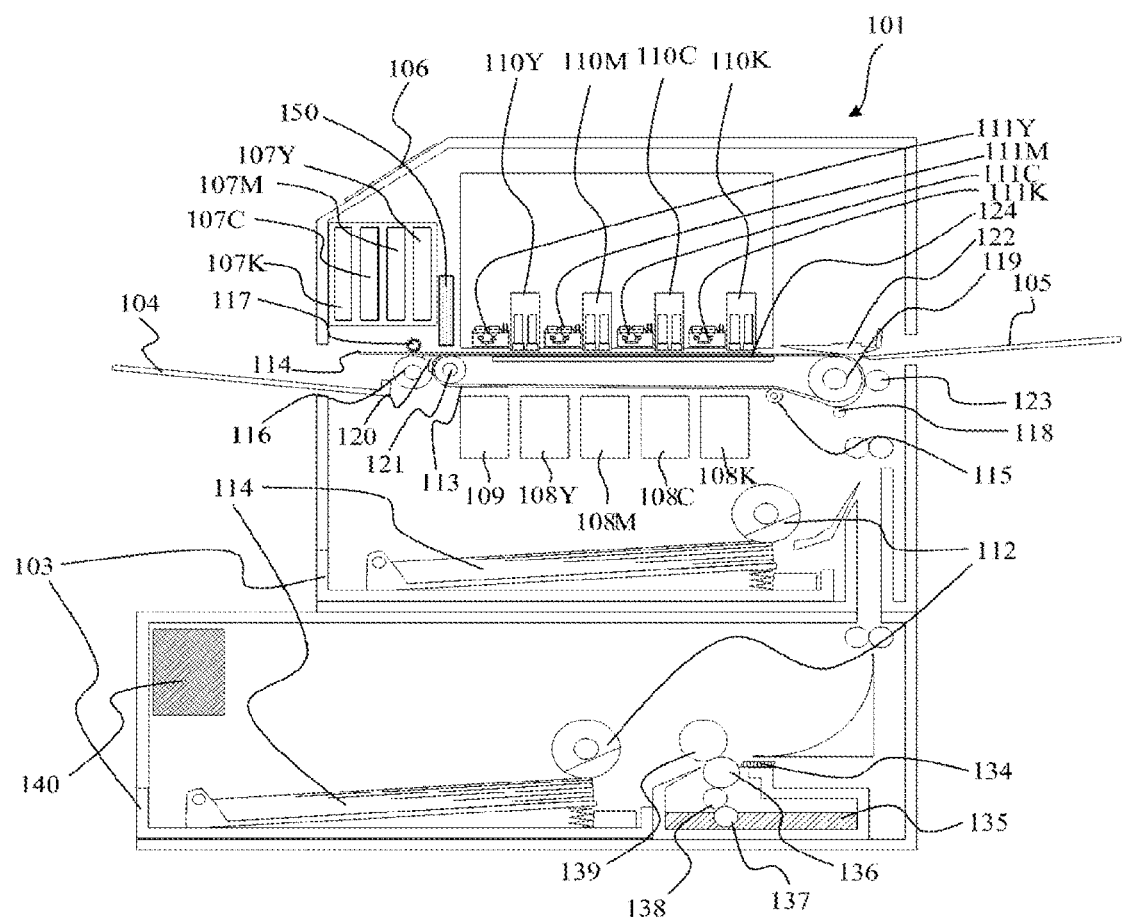
FIG. 1 is a schematic view (explanatory side plane view) illustrating one example of an image forming apparatus for use in the present invention.

DETAILED DESCRIPTION OF THE INVENTION (Image Forming Set)

The image forming set of the present invention includes an aqueous ink and a post-treatment liquid. The image forming set may further contain other components, if necessary.

JP-B No. 4525778 has the following problem. A difference between the SP value of the water-soluble organic solvent of the post-treatment liquid and the SP value of the water-soluble organic solvent in the aqueous ink is small. When the post-treatment liquid is applied to an unfixed image formed by jetting the aqueous ink, the image and the post-treatment liquid tend to be mixed with each other, and hence a uniform coating film of the post-treatment liquid cannot be formed on the surface of the image, and glossiness of the image cannot be attained.

If a difference of the SP value of the aqueous ink and the SP value of the maintenance liquid is calculated from Examples in JP-B No. 5398401, the difference is small, i.e., 0.05 $(cal/cm^3)^{1/2}$ to 1.13 $(cal/cm^3)^{1/2}$. Therefore, an image formed by jetting the aqueous ink, and the maintenance liquid tend to be mixed. Therefore, glossiness cannot be attained, even if the maintenance liquid is applied onto a surface of the image. Moreover, the object of the invention disclosed in JP-B No. 5398401 is to improve maintenance of a nozzle surface of an inkjet head, and JP-B No. 5398401 does not disclose or suggest an improvement of glossiness of a resulting image.

<Aqueous Ink>

The aqueous ink include a colorant, a water-soluble organic solvent, and water. The aqueous ink may further contain other ingredients, if necessary.

<<Colorant>>

The colorant is appropriately selected depending on the intended purpose without any limitation. Any of conventional pigments and dyes known to be used in aqueous inks can be used as the colorant.

Examples of the colorant include colorant particles, which are inorganic particles coated with carbon black, colorant particles, which area inorganic particles coated with an organic pigment, and colorant particles (a resin-coated pigment), which is a pigment coated with a resin. These may be used alone, or in combination.

Examples of a method for coating the inorganic particles with carbon black include a liquid drying method utilizing coagulation, or precipitation, and a drying mixing method where a mechanical force is applied with mixing.

Examples of a method for coating the inorganic particles with the organic pigment include a method where an organic pigment is precipitated in the presence of inorganic particles, and a method where inorganic particles and an organic pigment are mechanically mixed and milled. In the case where the organic pigment has excellent thermal stability, a method utilizing chemical vapor deposition can be also used. Moreover, it is preferred that an organosilane compound layer, which is generated from polysiloxane, and alkyl silane, be optionally disposed between each of the inorganic particles and the organic pigment. As the organosilane compound layer is disposed, adhesion between the inorganic particles and the organic pigment can be improved.

—Inorganic Particles—

Examples of the inorganic particles include titanium dioxide, silica, alumina, iron oxide, iron hydroxide, and tin oxide. These may be used alone, or in combination.

As for the shapes of the inorganic particles, a particle shape having a small aspect ratio is preferable, and spheres are more preferable. In the case where a color colorant is adsorbed on surfaces of the inorganic particles, the inorganic particles are preferably colorless transparent or white. In the case where a black colorant is adsorbed on surfaces of the inorganic particles, the inorganic particles are preferably black.

The number average primary particle diameter of the inorganic particles is preferably 7 nm to 30 nm, more preferably 7 nm to 20 nm. The number average primary particle diameter is an arithmetic mean value of equivalent circle diameters calculated by observing a sample prepared by a dusting method under a transmission electron microscope with magnification of ×50,000 to ×1,000,000 according to JIS Z8901-2006 "Testing powder and testing particles" 5.44 Particle diameter distribution (c) microscopic method, and observing 100 or more particles on the obtained microscopic image.

—Pigment—

The pigment is appropriately selected depending on the intended purpose without any limitation, and examples thereof include an inorganic pigment, and an organic pigment. These may be used alone, or in combination.

——Pigment for Coating Inorganic Particles——

Examples of the pigment that coats the inorganic particles include an inorganic pigment for black, an organic pigment for black, and an organic pigment for color. These may be used alone, or in combination.

Examples of the inorganic pigment for black include carbon black.

Examples of the organic pigment for black include aniline black. These may be used alone, or in combination.

Examples of the organic pigment for color include anthraquinone, phthalocyanine blue, phthalocyanine green, a diazo pigment, a monoazo pigment, pyranthrone, perylene, heterocyclic yellow, quinacridone, and (thio)indigoid. These may be used alone, or in combination. Among them, preferred in view of coloring ability are a phthalocyanine-based pigment, a quinacridone-based pigment, a monoazo yellow-based pigment, a diazo yellow-based pigment, and a heterocyclic yellow-based pigment.

Examples of the phthalocyanine-based pigment include copper phthalocyanine blue or a derivative of copper phthalocyanine blue (e.g., C.I. Pigment Blue 15:3, and C.I. Pigment Blue 15:4), and aluminium phthalocyanine. These may be used alone, or in combination.

Examples of the quinacridone-based pigment include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, C.I. Pigment Violet 19, and C.I. Pigment Violet 42. These may be used alone, or in combination.

Examples of the monoazo yellow-based pigment include C.I. Pigment Yellow 74, C.I. Pigment Yellow 109, C.I. Pigment Yellow 128, and C.I. Pigment Yellow 151. These may be used alone, or in combination.

Examples of the diazo yellow-based pigment include C.I. Pigment Yellow 14, C.I. Pigment Yellow 16, and C.I. Pigment Yellow 17. These may be used alone, or in combination.

Examples of the heterocyclic yellow pigment include C.I. Pigment Yellow 117, and C.I. Pigment Yellow 138. These may be used alone, or in combination.

A mass ratio (the inorganic particles/the pigment coating the inorganic particles) of the inorganic particles to the pigment that coats the inorganic particles is preferably 3/1 to 1/3, more preferably 3/2 to 1/2. When the mass ratio (the inorganic particles/the pigment coating the inorganic particles) is in the range of 3/1 to 1/3, reduction in coloring ability and tinting ability can be prevented, and transparency and color tone can be appropriately adjusted.

As for the colorant, in which the inorganic particles are coated with the pigment, a commercial product can be used. Examples of the commercial product include a silica/carbon black composite material, a silica/phthalocyanine C.I. Pigment Blue 15:3 composite material, a silica/disazo yellow composite material, and a silica/quinacridon C.I. Pigment Red 122 composite material (all manufactured by TODA KOGYO CORPORATION), as the aforementioned products have small number average primary particle diameters. These may be used alone, or in combination.

The volume average particle diameter of the colorant is preferably 10 nm to 200 nm, more preferably 20 nm to 100 nm. When the volume average particle diameter of the colorant is 10 nm or greater, the colorant can be dispersed within a short period of time, and storage stability of a resulting ink can be improved. When the volume average particle diameter of the colorant is 200 nm or smaller, color saturation of a resulting image is excellent, nozzle clogging is prevented, and ejection stability of the ink can be improved. Note that, the volume average particle diameter can be measured, for example, by means of a particle size distribution measuring device (product name: Microtrac UPA, manufactured by NIKKISO CO., LTD.).

——Resin-Coated Pigment——

Examples of the resin-coated pigment include an inorganic pigment, and an organic pigment.

Examples of the inorganic pigment include titanium oxide, iron oxide, calcium carbonate, barium sulfate, aluminium hydroxide, barium yellow, Prussian blue, cadmium red, chrome yellow, a metal powder, and carbon black. These may be used alone, or in combination. Among them, carbon black is preferable.

Examples of the carbon black as the resin-coated pigment include carbon black produced by a conventional method, such as a contact method, a furnace method, and a thermal method.

Examples of the organic pigment include an organic pigment for black, and an organic pigment for color. As for the organic pigment, an azo pigment, an azomethine pigment, a polycyclic pigment, a dye chelate, a nitro pigment, a nitroso pigment, and aniline black are preferable. Among them, the azo pigment, and the polycyclic pigment are more preferable.

Examples of the azo pigment include azo lake, an insoluble azo pigment, a condensed azo pigment, and a chelate azo pigment.

Examples of the polycyclic pigment include a phthalocyanine pigment, a perylene pigment, a perynone pigment, an anthraquinone pigment, a quinacridone pigment, a dioxazine pigment, an indigo pigment, a thioindigo pigment, an isoindolinone pigment, a quinophthalone pigment, and a rhodamine β lake pigment. These may be used alone, or in combination.

Examples of the organic pigment for black include: a carbon black (C.I. Pigment Black 7) compound, such as furnace black, lamp black, acetylene black, and channel black; a metal compound, such as copper, iron (C.I. Pigment Black 11), and titanium oxide; and aniline black (C.I. Pigment Black 1). These may be used alone, or in combination.

Examples of the carbon black as the organic pigment for black include carbon black produced by a furnace method or a channel method.

The number average primary particle diameter of the carbon black as the organic pigment for black is preferably 15 nm to 40 nm. The BET specific surface area of the carbon black is preferably 50 m$^2$/g to 300 m$^2$/g. The DBP oil absorption of the carbon black is preferably 40 mL/100 g to 150 mL/100 g. The volatile matter content of the carbon black is preferably 0.5% to 10%. The pH of the carbon black is preferably 2 to 9.

As for the carbon black as the organic pigment for black, a commercial product can be used. Examples of the commercial product include: MA 7, MA 8, and MA 100 (all product names, manufactured by Mitsubishi Chemical Corporation); Raven 1080 and Raven 1100 (manufactured by Columbian Chemicals Co.); and Mogul, Monarch 700, and Monarch 800 (all product names, manufactured by Cabot Corporation).

Examples of the organic pigment for color include a pigment usable for a yellow ink, a pigment usable for a magenta ink, and a pigment usable for a cyan ink. These may be used alone, or in combination.

The pigment usable for a yellow ink is appropriately selected depending on the intended purpose without any limitation. Examples of the pigment usable for a yellow ink include C.I. Pigment Yellow 1, C.I. Pigment Yellow 12, C.I. Pigment Yellow 74, and C.I. Pigment Yellow 96. These may be used alone, or in combination. Among them, C.I. Pigment Yellow 74 is preferable in view of the color tone and lightfastness.

The pigment usable for a magenta ink is appropriately selected depending on the intended purpose without any limitation. Examples of the pigment usable for a magenta ink include C.I. Pigment Red 5, C.I. Pigment Red 7, C.I. Pigment Red 12, C.I. Pigment Violet 19, and C.I. Pigment Red 122. These may be used alone, or in combination. Among them, C.I. Pigment Red 122, C.I. Pigment Violet 19 are preferable in view of the color tone and lightfastness.

The pigment usable for a cyan ink is appropriately selected depending on the intended purpose without any limitation. Examples of the pigment usable for a cyan ink include C.I. Pigment Blue 1, C.I. Pigment Blue 15:3, and C.I. Pigment Blue 15:4. These may be used alone, or in combination. Among them, Pigment Blue 15:3 is preferable in view of the color tone and lightfastness.

Moreover, the pigment contained in each ink for use in the present invention may be appropriately synthesized, or selected from commercial products.

——Resin Used for Resin-Coated Pigment——

Examples of the resin used for the resin-coated pigment include an anionic group-containing organic high molecular compound.

The anionic group-containing organic high molecular compound is not particularly limited, as long as the high molecular compound can impart self dispersibility or solubility to water through neutralization of anionic groups.

Examples of the anionic group include a carboxyl group, a sulfonic acid group, and a phosphonic acid group. Among them, a carboxyl group is preferable, as the carboxyl group exhibits excellent self dispersibility or solubility, when the carboxyl group is neutralized with a basic compound.

The acid value of the anionic group is preferably 30 mgKOH/g to 150 mgKOH/g, more preferably 50 mgKOH/g to 150 mgKOH/g. When the acid value is 30 mgKOH/g or greater, redispersibility to water is excellent after neutralization through acid precipitation, and dispersion stability of the pigment can be improved. When the acid value is 150 mgKOH/g or less, hydrophilicity is maintained at the appropriate level, water resistance of a resulting print can be improved.

The composition of the anionic group-containing organic high molecular compound is appropriately selected depending on the intended purpose without any limitation. Examples of the anionic group-containing organic high molecular compound include a polyvinyl-based resin, a polyester-based resin, an amino-based resin, a (meth)acrylic resin, an epoxy-based resin, a polyurethane-based resin, a polyether-based resin, a polyamide-based resin, an unsaturated polyester-based resin, a phenol-based resin, a silicone-based resin, and a fluorine-based high molecular compound. These may be used alone, or in combination. Among them, a (meth)acrylic resin is preferable. The more preferred is an acrylic resin, which contains, as essential components, (meth)acrylic acid, and at least one of alkyl ester of the (meth)acrylic acid, and hydroxyalkyl ester of the (meth) acrylic acid, and in which an amount of the acryl monomer and styrene is 80% by mass or greater. Note that, the (meth)acrylic resin denotes a methacrylic resin, and an acrylic resin, and the (meth)acrylic acid denotes methacrylic acid, and acrylic acid.

For example, the acrylic resin can be obtained by adding an anionic group-containing acryl monomer, and optionally another monomer capable of copolymerizing with the anionic group-containing acryl monomer, and polymerizing the monomers in a solvent.

Examples of the anionic group-containing acryl monomer include an anionic group-containing acryl monomer that is at least one selected from the group consisting of a carboxyl group-containing monomer, a sulfonic acid group-containing acryl monomer, and a phosphonic acid group-containing acryl monomer. Among them, a carboxyl group-containing acryl monomer is preferable. In order to improve solvent resistance and durability of a capsulation layer, and enhance abrasion resistance of a resulting print, moreover, a crosslinkable functional group-containing monomer can be also used.

Examples of the carboxyl group-containing acryl monomer include acrylic acid, methacrylic acid, crotonic acid, ethacrylic acid, propyl acrylate, isopropyl acrylate, itaconic acid, and fumaric acid.

Examples of the sulfonic acid group-containing acryl monomer include sulfoethyl methacrylate, and butyl acrylamide sulfonic acid.

Examples of the phosphonic acid group-containing acryl monomer include phosphoethyl methacrylate.

Examples of the anionic group-containing organic high molecular compound include a carboxyl group-containing styrene/acryl copolymer.

An amount of the colorant relative to a total amount of the aqueous ink is preferably 1% by mass to 20% by mass, more preferably 2% by mass to 15% by mass.

<<Mixed Solution>>

The mixed solution includes a water-soluble organic solvent and water. The mixed solution is a solution including a water-soluble organic solvent, and water, and includes one or more compounds that is functionally classified as a penetrating agent or an antifoaming agent.

The solubility parameter (may be referred to as an "SP value" hereinafter) of the mixed solution in the aqueous ink is preferably 18 $(cal/cm^3)^{1/2}$ to 22 $(cal/cm^3)^{1/2}$, more preferably 19 $(cal/cm^3)^{1/2}$ to 21 $(cal/cm^3)^{1/2}$.

The SP value of the mixed solution of the water-soluble organic solvent and the water contained in the aqueous ink can be calculated according to the following formula (A).

SP value of mixed solution in aqueous ink $(cal/cm^3)^{1/2}=$

[SP value of Water-Soluble Organic Solvent $A$×volume fraction of Water-Soluble Organic Solvent $A$]+

[SP value of Water-Soluble Organic Solvent $B$×volume fraction of Water-Soluble Organic Solvent $B$]+ . . . +

[SP value of Water-Soluble Organic Solvent $N$×volume fraction of Water-Soluble Organic Solvent $N$]+

[SP value of water×volume fraction of water]    Formula (A)

In the formula (A), the mixed solution is a mixed solution of the water-soluble organic solvent and the water.

The SP value is a numeral value indicating a degree of solubility to each other. The SP value is represented with the square root of the attraction force between molecules, i.e., cohesive energy density (CED). Note that, the CED is the energy quantity required for evaporating in an amount of 1 mL.

The SP value can be calculated using the following formula (B) in accordance with the Fedors method.

SP value (solubility parameter)=(CED value)$^{1/2}=(E/V)^{1/2}$    Formula (B)

In the formula (B), E is the molecular cohesive energy (cal/mol), and V is the molecular volume (cm$^3$/mol). When the evaporation energy of the atom group is determined as $\Delta ei$, and the molar volume is determined as $\Delta vi$, E and V are represented by the following formulae (C) and (D), respectively.

$E=\Sigma\Delta ei$    Formula (C)

$V=\Sigma\Delta vi$    Formula (D)

There are various calculation methods for an SP value, but the Fedors method, which is typically used, is used in the present invention.

As for various data for the calculation method, the evaluation energy $\Delta ei$ of each atom group, and the molar volume $\Delta vi$, the data disclosed in "Basic Theory of Adhesion" (Minoru Imoto, published by Polymer Science Publication, Chapter 5).

Moreover, the data that does not disclosed in the publication above, such as the data related to —CF$_3$ group, R. F. Fedors, Polym. Eng. Sci. 14, 147 (1974) can be referred.

For reference, the SP vale represented by the formula (B) is multiplied with 2.046, when the value is converted to the unit of $(J/cm^3)^{1/2}$, and the SP value represented by the formula (B) is multiplied with 2,046, when the value is converted to the SI unit of $(J/m^3)^{1/2}$.

Note that, in the present invention, only the water-soluble organic solvent and the water contained in the amount of 3% by mass or greater relative to the total amount of the aqueous ink are considered in the calculation of the SP value.

A mass ratio (water-soluble organic solvent/water) of the amount (% by mass) of the water-soluble organic solvent to the amount (% by mass) of the water in the mixed solution is preferably 0.5 to 2, more preferably 0.8 to 1.2.

—Water-Soluble Organic Solvent—

The water-soluble organic solvent is added for the purpose of preventing an ink from drying, and improving dispersion stability of the ink.

Examples of the water-soluble organic solvent include a polyhydric alcohol compound, a polyhydric alcohol alkyl ether compound, a polyhydric alcohol aryl ether compound, a nitrogen-containing heterocyclic compound, an amide compound, an amine compound, a sulfur-containing compound, propylene carbonate, and ethylene carbonate.

Examples of the polyhydric alcohol compound include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylol ethane, trimethylolpropane, 1,2,3-butanetriol, 1,2,4-butanetriol, 1,2,6-hexanetriol, and 3-methylpentane-1,3,5-triol. These may be used alone, or in combination.

Examples of the polyhydric alcohol alkyl ether compound include diethylene glycol monomethyl ether, ethylene glycol monoethyl ether, ethylene glycol monobutyl ether, diethylene glycol monoethyl ether, diethylene glycol monobutyl ether, tetraethylene glycol monomethyl ether, and propylene glycol monoethyl ether. These may be used alone, or in combination.

Examples of the polyhydric alcohol aryl ether compound include ethylene glycol monophenyl ether, and ethylene glycol monobenzyl ether. These may be used alone, or in combination.

Examples of the nitrogen-containing heterocyclic compound include 2-pyrrolidone, N-methyl-2-pyrrolidone, N-hydroxyethyl-2-pyrrolidone, 1,3-dimethylimidazolidinone, ε-caprolactam, γ-butyrolactone. These may be used alone, or in combination.

Examples of the amide compound include acetoamide, dimethyl formamide, and diethyl acetoamide. These may be used alone, or in combination.

Examples of the amine compound include monoethanol amine, diethanol amine, triethanol amine, monoethyl amine, diethyl amine, and triethyl amine. These may be used alone, or in combination.

Examples of the sulfur-containing compound include dimethyl sulfoxide, sulfolane, and thiodiethanol. These may be used alone, or in combination.

Among them, glycerin, diethylene glycol, 1,3-butanediol, and 3-methyl-1,3-butanediol are preferable in view of prevention of jetting failures due to solubility and moisture evaporation, storage stability, and ejection stability.

An amount of the water-soluble organic solvent relative to a total amount of the aqueous ink is preferably 20% by mass to 50% by mass, more preferably 25% by mass to 35% by mass.

—Water—

The water is appropriately selected depending on the intended purpose without any limitation. Examples of the water include pure water (e.g., ion-exchanged water, ultra-filtration water, Milli Q water, and distilled water), and ultra-pure water. These may be used alone, or in combination. Note that, the SP value of the water is 23.4 $(cal/cm^3)^{1/2}$.

An amount of the water relative to the total amount of the aqueous ink is preferably 60% by mass or less, more preferably 20% by mass to 60% by mass. When the amount of the water is 60% by mass or less, increase in the viscosity of the post-treatment liquid, gelation, and precipitation of insoluble matter, which may be caused when water is evaporated, can be prevented.

<<Other Ingredients>>

The aforementioned other ingredients are not particularly limited, as long as the ingredients can be used in the aqueous ink. Examples of the ingredients include a sugar compound or a derivative of the sugar compound, a surfactant, an antifoaming agent, a carboxyl group-containing resin, a penetrating agent, polymer particles, a pH regulator, an antifungal agent, and an anti-rust agent.

—Sugar Compound and Derivative Thereof—

The sugar compound is added for the purpose of improving anti-drying properties. Examples of the sugar compound include monosaccharides, dissaccharides, oligosaccharides (including trisaccharides, and tetrasaccharides), polysaccharides, and derivatives thereof. Specific examples of the sugar compound include glucose, mannose, fructose, ribose, xylose, trehalose, and maltotriose. These may be used alone, or in combination. Note that, the polysaccharides mean sugar in the broad sense, and are used to refer to materials widely present in the nature, such as α-cyclodextrin, and cellulose. Examples of the derivative of the sugar compound include reducing sugar of the aforementioned sugar compound, and oxidizing sugar of the aforementioned sugar compound. These may be used alone, or in combination. Among them, sugar alcohol is preferable, and maltitol and sorbit are more preferable. The amount of the sugar compound and derivative thereof relative to the total amount of the aqueous ink is preferably 0.1% by mass to 40% by mass, more preferably 0.5% by mass to 30% by mass.

—Surfactant—

The surfactant is appropriately selected from surfactants that do not impair dispersion stability depending on a colorant for use or a combination of a water-soluble organic solvent and a penetrating agent, according to the intended purpose without any limitation. In the case recording is performed on a recording medium, particularly, the surfactant is a fluorosurfactant or a silicone surfactant, in view of low surface tension, and high leveling properties. These may be used alone, or in combination. Among them, the fluorosurfactant is preferable.

——Fluorosurfactant——

In view of low foamability, examples of the fluorosurfactant for use include a perfluoroalkyl sulfonic acid compound, a perfluoroalkyl carboxylic acid compound, a perfluoroalkyl phosphoric acid ester compound, a perfluoroalkyl ethylene oxide adduct, and a polyoxyalkylene ether polymer compound containing a perfluopoalkyl ether group at a side chain of the polymer. These may be used alone, or in combination.

Examples of the perfluoroalkyl sulfonic acid compound include perfluoroalkyl sulfonic acid, and perfluoroalkyl sulfonic acid salt. These may be used alone, or in combination.

Examples of the perfluoroalkyl carboxylic acid compound include perfluoroalkyl carboxylic acid, and perfluoroalkyl carboxylic acid salt. These may be used alone, or in combination.

Examples of the perfluoroalkyl phosphoric acid ester compound include perfluoroalkyl phosphonic acid ester, and a salt of perfluoroalkyl phosphonic acid ester. These may be used alone, or in combination.

Examples of the polyoxyalkylene ether polymer compound containing a perfluopoalkyl ether group at a side chain of the polymer include sulfate of a polyoxyalkylene ether polymer containing a perfluoroalkyl ether group at a side chain thereof, and a salt of a polyoxyalkylene ether polymer containing a perfluoroalkyl ether group at a side chain thereof. These may be used alone, or in combination.

Examples of a counter ion of the salt in the aforementioned fluorosurfactant include ions, such as Li, Na, K, $NH_4$, $NH_3CH_2CH_2OH$, $NH_2(CH_2CH_2OH)_2$, and $NH(CH_2CH_2OH)_3$.

The fluorosurfactant may be appropriately synthesized for use, or selected from commercial products. Examples of the commercial product of the fluorosurfactant include: SURFLON series (S-111, S-112, S-113, S-121, S-131, S-132, S-141, S-145) manufactured by Asahi Glass Co., Ltd.; FLOURAD series (FC-93, FC-95, FC-98, FC-129, FC-135, FC-170C, FC-430, FC-431) manufactured by Sumitomo 3M limited; MEGAFACE series (F-470, F-1405, F-474) manufactured by DIC Corporation; Zonyl TBS, FSP, FSA, FSN-100, FSN, FSO-100, FSO, FS-300, UR, all manufactured by Du Pont Kabushiki Kaisha; FT-110, FT-250, FT-252, FT-400S, FT-150, FT-400SW, all manufactured by NEOS COMPANY LIMITED; and PF-151N manufactured by Omnova Solutions, Inc. These may be used alone, or in combination. Among them, preferred is the fluorosurfactant represented by the following formula (i).

$C_4F_9$—$CH_2CH(OH)CH_2O$—$(CH_2CH_2O)_8$—$CH_2CH(OH)CH_2$—$C_4F_9$      Formula (i)

Note that, the fluorosurfactant represented by the formula (i) above does not include perfluorooctane sulfonate (PFOS) and perfluorooctanoic acid (PFOA), and therefore the compound represented by the formula (i) is excellent in view of no concern regarding possible environmental pollution.

——Silicone Surfactant——

The silicone surfactant is appropriately selected depending on the intended purpose without any limitation. Examples of the silicone surfactant for use include silicone surfactants that are not decomposed at high pH. Specific, preferred as the silicone surfactant are side chain-modified polydimethylsiloxane, both terminal-modified polydimethylsiloxane, one terminal-modified polydimethylsiloxane, and side chain both terminal-modified polydimethylsiloxane. More preferred are silicone surfactants containing, as a modifying group, a polyoxyethylene group, and a polyoxyethylene polyoxypropylene group, as theses silicone surfactants exhibits excellent characteristics as aqueous surfactants.

Examples of the silicone surfactant include a polyether-modified silicone surfactant. Among the polyether-modified silicone surfactant, a compound, in which a polyalkylene oxide structure is introduced into a Si site of a side chain of dimethyl siloxane, is preferable.

The silicone surfactant may be appropriately synthesized for use, or selected from commercial products.

Examples of the commercial product of the silicone surfactant include products available from BYK Japan K.K., Shin-Etsu Chemical Co., Ltd., and Dow Corning Toray Co., Ltd. Examples of the polyether-modified silicone compound include KF-618, KF-642, and KF-643, manufactured by Shin-Etsu Chemical Co., Ltd. These may be used alone, or in combination.

——Other Surfactants——

Examples of other surfactants than the fluorosurfactant and the silicone surfactant include an anionic surfactant, a nonionic surfactant, an acetylene glycol-based surfactant, and an amphoteric surfactant. These may be used alone, or in combination.

Examples of the anionic surfactant include an acetic acid salt of polyoxyethylene alkyl ether, dodecyl benzene sulfonic acid salt, succinic acid ester sulfonic acid salt, lauric acid salt, and polyoxyethylene alkyl ether sulfate salt. These may be used alone, or in combination.

Examples of the nonionic surfactant include an acetylene glycol surfactant, polyoxyethylene alkyl ether, polyoxyethylene alkyl phenyl ether, polyoxyethylene alkyl ester, and polyoxyethylene sorbitan fatty acid ester. These may be used alone, or in combination.

Examples of the acetylene glycol surfactant include 2,4,7,9-tetramethyl-5-decine-4,7-diol, 3,6-dimethyl-4-octine-3,6-diol, and 3,5-dimethyl-1-hexine-3-ol. These may be used alone, or in combination. Examples of a commercial product of the acetylene glycol surfactant include SURFYNOL series (104, 82, 465, 485, TG) manufactured by Air Products and Chemicals, Inc. These may be used alone, or in combination.

Examples of the amphoteric surfactant include lauryl aminopropionic acid salt, lauryl dimethyl betaine, stearyl dimethyl betaine, lauryl dihydroxyethyl betaine, lauryl dimethyl amine oxide, myristyl dimethyl amine oxide, stearyl dimethyl amine oxide, dihydroethyl lauryl amine oxide, polyoxyethylene coconut oil alkyldimethyl amine oxide, dimethylalkyl(coconut oil) betaine, and dimethyl lauryl betaine. These may be used alone, or in combination. Examples of a commercial product of the amphoteric surfactant include products available from Nikko Chemicals Co., Ltd., Nihon Emulsion Co., Ltd., Nippon Shokubai Co., Ltd., TOHO Chemical Industry Co., Ltd., Kao Corporation, ADEKA CORPORATION, Lion Corporation, AOKI OIL INDUSTRIAL CO., LTD., and Sanyo Chemical Industries, Ltd. These may be used alone, or in combination.

The aforementioned various surfactants may be used alone, or in combination. Even in the case where the surfactant per se is hardly dissolved in the aqueous recording ink, the surfactant is dissolved by mixing a plurality of the surfactants, so that the surfactants can be stably present.

An amount of the surfactant relative to the total amount of the aqueous ink is preferably 0.01% by mass to 4% by mass, more preferably 0.1% by mass to 1% by mass. When the amount of the surfactant is 0.01% by mass or greater, an effect obtainable by adding the surfactant can be sufficiently exhibited. When the amount of the surfactant is 4% by mass or less, permeation of the aqueous ink to a recording medium is appropriately maintained, and a problem, such as a strike-through, which is caused by excessive permeation of the ink, can be prevented.

—Antifoaming Agent—

The antifoaming agent is added for the purpose of inhibiting generating air bubbles.

The surfactant including the compound represented by the formula (i) has an extremely high surface activation ability. Even when a commonly used silicone antifoaming agent is added together with the surfactant, once air bubbles are generated, the bubbles are remained without defoaming. Such the generated air bubbles may cause a problem. As the antifoaming agent is added, the problem, such as ejection failures caused when the ink is ejected from the ejection head, can be prevented.

Examples of the antifoaming agent include N-octyl-2-pyrrolidone, 2,4,7,9-tetramethyldecane-4,7-diol, and 2,5,8,11-tetramethyldodecane-5,8-diol. These may be used alone, or in combination. As at least one of the aforementioned antifoaming agent is used together with the surfactant, such as the compound represented by the formula (i), generation of air bubbles is suppressed, and a problem caused by the generated air bubbles can be prevented.

As for an amount of the antifoaming agent, a total amount of the amount (% by mass) of the surfactant and the amount (% by mass) of the antifoaming agent relative to the total amount of the aqueous ink is preferably 40% by mass or less, more preferably 30% by mass or less. When the total amount of the amount of the surfactant and the amount of the antifoaming agent relative to the total amount of the aqueous ink is 40% by mass or less, the aqueous ink is prevented from foaming.

—Carboxyl Group-Containing Resin—

The carboxyl group-containing resin is added for the purpose of reacting with a crosslinking agent contained in the post-treatment liquid to cause arrogation of pigment particles on the recording medium to thereby improve an image quality. Even in the case where no post-treatment liquid is present, moreover, abrasion resistance of a resulting image is improved, as the carboxyl group-containing resin is contained in the aqueous ink.

Examples of the carboxyl group-containing resin include a maleic acid resin, a styrene-maleic acid resin, a rosin-modified maleic acid resin, an alkyd resin, and a modified alkyd resin. These may be used alone, or in combination.

The carboxyl group-containing resin may be appropriately synthesized for use, or selected from commercial products. Examples of the commercial product of the carboxyl group-containing resin include: MALKYD series manufactured by Arakawa Chemical Industries, Ltd.; and HARIMACK series, and HARIPHTHAL series manufactured by Harima Chemicals Group, Inc.

As for an embodiment for adding the carboxyl group-containing resin, the carboxyl group-containing resin may be added in the state where a pigment serving as the colorant is encapsulated (microcapsulated) with the carboxyl group-containing resin, or the carboxyl group-containing resin may be added in the state where the colorant is dispersed in the carboxyl group-containing resin.

—Penetrating Agent—

The penetrating agent is added for the purpose of increasing a penetrating speed of the aqueous ink into a recording medium, as well as preventing bleeding.

Examples of the penetrating agent include a C8-C11 polyol compound, and a glycol ether compound. These may be used alone, or in combination.

The penetrating agent is a partially water-soluble compound, which has an effect of increasing the penetration speed of the ink into a recording medium and preventing bleeding, has a boiling point higher than the boiling point of water, and has solubility of 0.1% by mass to 4.5% by mass in water of 25° C.

Examples of the C8-C11 polyol compound include 2-ethyl-1,3-hexanediol, 2,2,4-trimethyl-1,3-pentanediol, and 1,2-octanediol. These may be used alone, or in combination.

Examples of the glycol ether compound include a polyhydric alcohol alkyl ether compound, and a polyhydric alcohol aryl ether compound. These may be used alone, or in combination.

Examples of the polyhydric alcohol alkyl ether compound include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether. These may be used alone, or in combination.

Examples of the polyhydric alcohol aryl ether compound include ethylene glycol monophenyl ether, and ethylene glycol monobenzyl ether. These may be used alone, or in combination.

An amount of the penetrating agent relative to the total amount of the aqueous ink is preferably 0.1% by mass to 10% by mass, more preferably 0.5% by mass to 5% by mass.

—Polymer Particles—

The polymer particles are added for the purpose of improving film forming ability. Note that, the film forming ability is a characteristic that a resin film is formed from an aqueous emulsion, in which polymer particles are dispersed in water, as the moisture of the aqueous emulsion is evaporated.

Since the polymer particles are contained in the aqueous ink, the polymer particles form a film when the volatile components in the aqueous ink are evaporated, to strongly adhere the colorant in the aqueous ink onto a recording medium. As a result of the film, an image having excellent abrasion resistance and water resistance can be attained.

The minimum film forming temperature of the polymer particles are preferably 30° C. or lower, more preferably 10° C. or lower, in order to form a film at room temperature. Note that, the minimum film forming temperature is the lowest temperature at which a transparent continuous film is formed, when a polymer emulsion, which is obtained by dispersing polymer particles in water, is thinly flow casted onto a metal plate, such as aluminium, with increasing temperature. Examples of the polymer particles include Landi PL series manufactured by MIYOSHI OIL & FAT CO., LTD.

The volume average particle diameter of the polymer particles is preferably 5 nm to 200 nm, more preferably 10 nm to 100 nm. Note that, the volume average particle diameter can be measured, for example, by means of a particle size distribution measuring device (product name: Microtrac UPA, manufactured by NIKKISO CO., LTD.).

Examples of the structure of the polymer particles include q single particle structure. For example, an alkoxysilyl group is contained in an emulsion particle, the alkoxysilyl group is brought into moisture remained, as fusion of emulsion particles due to moisture evaporation in the process of forming a coating film, to thereby cause hydrolysis and form a silanol group. As a silanol group is remained, moreover, the alkoxysilyl group or silanol group are reacted to another to form a rigid crosslink structure formed of a siloxane bond.

In the manner as described, when a reactive functional group is present in the polymer particle, a network structure can be formed during formation of a film by reacting the functional groups, without adding a curing agent.

Moreover, polymer particles having a core-shell structure, in which each of cores is surrounded by a shell, can be used. Note that, the core-shell structure is an embodiment where two or more polymers each having a different composition are present in each particle in the state of phase separation. The polymer particles having the core-shell structure include not only an embodiment where core are completely covered with shells, but also an embodiment where part of each core is covered with a shell. Moreover, part of the polymer of the shell may form domains within core particles. Moreover, the polymer particles may have a multi-layer structure of three or more layers, where one or more layers having different compositions are disposed between the core and the shell.

The polymer particles can be obtained by a conventional method, such as a method where an unsaturated vinyl monomer (unsaturated vinyl polymer) is polymerized through emulsion polymerization in water in the presence of a polymerization catalyst and an emulsifier.

The amount of the polymer particles relative to the total amount of the aqueous ink is preferably 0.5% by mass to 20% by mass, more preferably 1% by mass to 5% by mass.

—pH Regulator—

The colorant particles (composite pigment particles), in which the inorganic particles are covered with the colorant, tend to exhibit acidity, when the colorant particles are kneaded and dispersed in water together with an anionic dispersing agent. Surfaces of the composite pigment particles dispersed in a medium, such as water, are surrounded with the anionic dispersing agent, and therefore the surfaces are negatively charged, but the entire ink is acidic. Therefore, the inner area of the composite pigment particle is positively charged, which tends to neutralize the negative charge of the particle surface. In this state, the dispersed particles tend to be aggregated, and the aggregated particles may cause ejection failures. Accordingly, it is preferred that the dispersion state be stabilized and the ejection is stabilized by adding the pH regulator to maintain the ink alkaline.

The pH of the aqueous ink is preferably 9 to 11. When the pH is in the range of 9 to 11, corrosion of a member, such as an aqueous ink applying unit, can be prevented. The pH regulator is more preferably added to a kneading dispersion liquid together with additives, such as a wetting agent, and a penetrating agent, than added to water together with a dispersing agent at the time of kneading and dispersing. This is because the addition of the pH regulator may destroy a dispersion state depending on the pH regulator for use.

Examples of the pH regulator include an alcohol amine compound, alkali metal hydroxide, ammonium hydroxide, phosphonium hydroxide, and alkali metal carbonate. These may be used alone, or in combination.

Examples of the alcohol amine compound include diethanol amine, triethanol amine, and 2-amino-2-ethyl-1,3-propanediol. These may be used alone, or in combination.

Examples of the alkali metal hydroxide include lithium hydroxide, sodium hydroxide, and potassium hydroxide. These may be used alone, or in combination.

Examples of the ammonium hydroxide include ammonium hydroxide, and quaternary ammonium hydroxide. These may be used alone, or in combination.

Examples of the phosphonium hydroxide include quaternary phosphonium hydroxide.

Examples of the alkali metal carbonate include lithium carbonate, sodium carbonate, and potassium carbonate. These may be used alone, or in combination.

—Antifungal Agent—

Examples of the antifungal agent include benzotriazole, sodium dehydroacetate, sodium sorbate, sodium 2-pyridinethiol-1-oxide, sodium benzoate, and sodium pentachlorophenol. These may be used alone, or in combination.

—Anti-Rust Agent—

Examples of the anti-rust agent include acidic sulfite, sodium thiosulfate, ammonium thioglycolate, diisopropyl ammonium nitrite, pentaerythirotol tetranitrate, and dicyclohexyl ammonium nitrite. These may be used alone, or in combination.

<Post-Treatment Liquid>

The post-treatment liquid is included in the image forming set for the purpose of improving glossiness of an image.

The post-treatment liquid includes at least one of a urethane resin and an acrylic resin, and a mixed solution of a water-soluble organic solvent and water. The post-treatment liquid may further contain wax, a self-crosslinking resin, and other ingredients, if necessary.

<<Mixed Solution>>

The mixed solution includes a water-soluble organic solvent, and water. The mixed solution is a solution containing a water-soluble organic solvent, and water, and includes one or more compounds, which are functionally classified as a penetrating agent or an antifoaming agent.

The SP value of the mixed solution in the post-treatment liquid is preferably 10 $(cal/cm^3)^{1/2}$ to 30 $(cal/cm^3)^{1/2}$, more preferably 12 $(cal/cm^3)^{1/2}$ to 19.0 $(cal/cm^3)^{1/2}$.

The SP value of the mixed solution of the water-soluble organic solvent and the water in the post-treatment liquid is preferably lower than the SP value of the mixed solution of the water-soluble organic solvent and the water in the aqueous ink by 1.5 $(cal/cm^3)^{1/2}$ or greater but 7.5 $(cal/cm^3)^{1/2}$ or less, and even more preferably lower by 3.0 $(cal/cm^3)^{1/2}$ to 5.0 $(cal/cm^3)^{1/2}$.

When the SP value of the mixed solution of the water-soluble organic solvent and the water in the post-treatment liquid is lower than the SP value of the mixed solution of the water-soluble organic solvent and the water in the aqueous ink by 1.5 $(cal/cm^3)^{1/2}$ or greater, glossiness is imparted to an image, as the post-treatment liquid is applied on a surface of the fixed image. Even when the post-treatment liquid is applied on a surface of the unfixed image, moreover, the post-treatment liquid is prevented from being mixed with the unfixed image, the post-treatment liquid forms a uniform coating film on the surface of the image, and thus glossiness can be imparted to the image. When the SP value of the mixed solution of the water-soluble organic solvent and the water in the post-treatment liquid is lower than the SP value of the mixed solution of the water-soluble organic solvent and the water in the aqueous ink by 7.5 $(cal/cm^3)^{1/2}$ or less, a coating film formed with the post-treatment liquid has a large thickness, to improve an abrasion resistance of a resulting image. Note that, the SP value of the water-soluble organic solvent, the SP value of the water, and the SP value of the mixed solution of the water-soluble organic solvent and the water in the post-treatment liquid can be measured in the same manner as the SP value of the water-soluble organic solvent, the SP value of the water, and the SP value of the mixed solution of the water-soluble organic solvent, and the water in the aqueous ink.

Note that, in the present invention, only the water-soluble organic solvent and the water contained in the amount of 3% by mass or greater relative to the total amount of the post-treatment liquid are considered in the calculation of the SP value.

A mass ratio (water-soluble organic solvent/water) of the amount (% by mass) of the water-soluble organic solvent to the amount (% by mass) of the water in the mixed solution is preferably 0.5 to 2, more preferably 0.8 to 1.2.

—Water-Soluble Organic Solvent—

Examples of the water-soluble organic solvent include 3-methoxy-1-butanol, 3-methoxy-3-methyl-1-butanol, diethylene glycol monoisopropyl ether, diethylene glycol monoisobutyl ether, tripropylene glycol methyl ether, 1-methoxy-2-propanol, the compound represented by the following formula (I), the compound represented by the following formula (II), and the compound represented by the following formula (III). These may be used alone, or in combination. The SP value of the mixed solution in the post-treatment liquid can be made lower than the SP value of the mixed solution in the aqueous ink by adding the water-soluble organic solvent to the post-treatment liquid.

$CH_3O(CH_2CHCH_3O)_2CH_3$     Formula (I)

$C_4H_9O(CH_2CH_2O)_2CH_3$     Formula (II)

$CH_3O(CH_2CHCH_3O)_3CH_3$     Formula (III)

For example, the post-treatment liquid is ejected from a recording head. In view of ejectability from the recording head, or maintenance of the device for use, the post-treatment liquid preferably contains, further to the water-soluble organic solvent, multivalent alcohol having the equilibrium moisture content of 30% by mass or greater at the temperature of 23° C. and the relative humidity of 80%, a compound represented by the following general formula (IV), a compound represented by the following general formula (V), and a compound represented by the following general formula (VI). These may be used alone, or in combination.

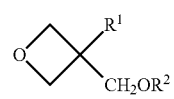

Formula (IV)

In the formula (IV) above, $R^1$ is a C1-C2 alkyl group, $R^2$ is a hydrogen atom, a C1-C8 alkyl group, a cyclic alkyl group, or an aromatic ring.

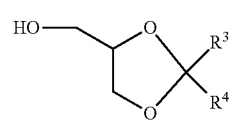

Formula (V)

In the formula (V) above, $R^3$ is a hydrogen atom or a C1-C2 alkyl group, and $R^4$ is a C1-C4 alkyl group.

Formula (VI)

In the formula (VI), $R^5$ and $R^6$ are each a C1-C8 alkyl group.

Examples of the polyhydric alcohol include 1,3-butanediol (melting point: 203° C. to 204° C., equilibrium moisture content: 35% by mass), 1,2,3-butanetriol (melting point: 175° C./33 hPa, equilibrium moisture content: 38% by mass), 1,2,4-butanetriol (melting point: 190° C. to 191° C./24 hPa, equilibrium moisture content: 41% by mass), glycerin (melting point: 290° C., equilibrium moisture content: 49% by mass), diglycerin (melting point: 270° C./20 hPa, equilibrium moisture content: 38% by mass), diethylene glycol (melting point: 245° C., equilibrium moisture content: 43% by mass), triethylene glycol (melting point: 285° C., equilibrium moisture content: 39% by mass), and tetraethylene glycol (melting point: 324° C. to 330° C., equilibrium moisture content: 37% by mass). These may be used alone, or in combination. Among them, glycerin and 1,3-butanediol are preferable.

The equilibrium moisture content (%) is determined by storing, for 24 hours, a laboratory dish, in which 1 g of each water-soluble organic solvent is weighed, in a desiccator the temperature and relative humidity of which has been maintained at 23° C.±1° C., and 80%±3%, respectively, using a potassium chloride/sodium chloride saturated aqueous solution to measure a moisture content equilibrated, and calculating from the following formula (E).

Equilibrium moisture content (%)=[an amount of moisture adsorbed by the water-soluble organic solvent/(an amount of the water-soluble organic solvent+an amount of moisture absorbed by the water-soluble organic solvent)]×100     Formula (E)

A water-soluble organic solvent other than the water-soluble organic solvent of the post-treatment liquid, and a wetting agent may be used in combination. Specifically, examples of a compound used for the water-soluble organic solvent or the wetting agent include a polyhydric alcohol compound, a polyhydric alcohol alkyl ether compound, a polyhydric alcohol aryl ether compound, a nitrogen-containing heterocyclic compound, an amide compound, an amine compound, a sulfur-containing compound, propylene carbonate, and ethylene carbonate. These may be used alone, or in combination.

Examples of the polyhydric alcohol compound include 3-methyl-1,3-butanediol, 1,5-pentanediol, 1,6-hexanediol, ethylene glycol, polyethylene glycol, propylene glycol, dipropylene glycol, tripropylene glycol, polypropylene glycol, hexylene glycol, trimethylol ethane, trimethylol propane, 1,2,6-hexanetriol, and 3-methylpentane-1,3,5-triol. These may be used alone, or in combination.

Examples of the polyhydric alcohol alkyl ether compound include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether. These may be used alone, or in combination.

Examples of the polyhydric alcohol aryl ether compound include ethylene glycol monophenyl ether, and ethylene glycol monobenzyl ether. These may be used alone, or in combination.

Examples of the amine compound include monoethanol amine, diethanol amine, triethanol amine, monoethyl amine, diethyl amine, and triethyl amine. These may be used alone, or in combination.

Examples of the sulfur-containing compound include dimethyl sulfoxide, sulfolane, and thiodiethanol. These may be used alone, or in combination.

An amount of the water-soluble organic solvent relative to the total amount of the post-treatment liquid is preferably 20% by mass to 40% by mass, more preferably 20% by mass to 30% by mass. When the amount of the water-soluble organic solvent is 20% by mass or greater, the liquidity of the post-treatment liquid can be secured even when the moisture in the post-treatment liquid is evaporated. When the amount of the water-soluble organic solvent is 30% by mass or less, the viscosity of the post-treatment liquid can be appropriately adjusted to the viscosity required for ejecting from a recording head.

—Water—

As for the water, the same water in the aqueous ink can be used.

<<Resin>>

The resin is added for the purpose of improving glossiness and abrasion resistance of an image.

The resin includes at least one of a urethane resin and an acrylic resin. The resin may further include other resins, if necessary.

In the case where two or more resins are used as the aforementioned resin, preferred is at least two resins each having a different volume average particle diameter. Specifically, the post-treatment liquid preferably contains at least one resin having the volume average particle diameter larger than the volume average particle diameter of the colorant in the aqueous ink, and at least one resin having the volume average particle diameter smaller than the volume average particle diameter of the colorant in the aqueous ink.

When the resin having the volume average particle diameter smaller than the volume average particle diameter of the colorant in the aqueous ink is used, the resin can enter into small spaces between the colorant particles to thereby improve an abrasion resistance of a resulting image. When the resin having the volume average particle diameter larger than the volume average particle diameter of the colorant in the aqueous ink is used, moreover, a coating film can be uniformly formed on a surface of the aqueous ink to improve smoothness, and thus glossiness of a resulting image can be improved. In addition, the physical adhesion between the resin and a recording medium can be improved. As a result, the resin itself is not peeled from the recording medium, and hence the abrasion resistance image can be improved. The glossiness of the image can be adjusted by controlling the volume average particle diameter of the resin, and smoothness during film formation.

The volume average particle diameter of the resin is preferably 10 nm to 300 nm. When the volume average particle diameter is 10 nm or greater, the viscosity of the resin can be adjusted not to be too high, and ejection stability of the post-treatment liquid from a recording head can be improved. When the volume average particle diameter of the resin is 300 nm or smaller, nozzle clogging of an image forming apparatus, which may be caused by the resin, may be prevented. Note that, the volume average particle diameter can be measured, for example, by means of a particle size distribution measuring device (product name: Microtrac UPA, manufactured by NIKKISO CO., LTD.).

The SP value of the at least one of the urethane resin and the acrylic resin in the post-treatment liquid is preferably 6 $(cal/cm^3)^{1/2}$ to 34 $(cal/cm^3)^{1/2}$, more preferably 8 $(cal/cm^3)^{1/2}$ to 23 $(cal/cm^3)^{1/2}$.

Moreover, a difference between the SP value of the at least one of the urethane resin and the acrylic resin in the post-treatment liquid and the SP value of the mixed solution of the water-soluble organic solvent and the water in the post-treatment liquid is preferably 4 $(cal/cm^3)^{1/2}$ or less. Note that, the phrase "a difference between the SP value of the at least one of the urethane resin and the acrylic resin in the post-treatment liquid and the SP value of the mixed solution of the water-soluble organic solvent and the water in the post-treatment liquid" means a difference between the SP value of the at least one of the resins, and the SP value of the mixed solution of the water-soluble organic solvent and the water in the post-treatment liquid, in the case where the post-treatment liquid includes one or more urethane resins, or the case where the post-treatment liquid includes one or more acrylic resins, or the case where the post-treatment liquid includes one or more urethane resins and one or more acrylic resins in combination, as long as at least one difference is 4 $(cal/cm^3)^{1/2}$ or less. In other words, the difference between each of the SP values of all of the resins contained in the post-treatment liquid, and the SP value of the mixed solution of the water-soluble organic solvent and the water in the post-treatment liquid does not need to be 4 $(cal/cm^3)^{1/2}$ or less.

When the difference between the SP value of the at least one of the urethane resin and the acrylic resins in the post-treatment liquid and the SP value of the mixed solution of the water-soluble organic solvent and the water in the post-treatment liquid is 4 $(cal/cm^3)^{1/2}$ or less, image glossiness can be improved.

The calculation method of the SP value of the resin is different from the calculation method of the SP values of the water-soluble organic solvent, the water, and the mixed solution. The SP value of the resin is a value measured by a turbidimetric titration method, and calculated using the following equation of K. W. SUH and J. M. CORBETT.

$$SP \text{ value of resin} = \{(V_{ml})^{1/2} \times \delta_H + (V_{mh})^{1/2} \times \delta_D +\}/\{(V_{ml})^{1/2} + (V_{mh})^{1/2}\}$$

In the equation above, $V_{ml}$, $V_{mh}$, $\delta_H$, and $\delta_D$ are values calculated by applying, in the following equations, a titer H (mL) at turbidity with a measuring temperature of 20° C., when 0.5 g of the resin (solid content) is dissolved in 10 mL of acetone, and n-hexane, and a titer D (mL) at turbidity with a measuring temperature of 20° C., when 0.5 g of the resin (solid content) is dissolved in 10 mL of acetone, and deionized water is added.

$$V_{ml} = 74.4 \times 130.3/\{(1-V_H) \times 130.3 + V_H \times 74.4\}$$

$$V_{mh} = 74.4 \times 18/\{(1-V_D) \times 18 + V_D \times 74.4\}$$

$$V_H = H/(10+H)$$

$$V_D = D/(10+D)$$

$$\delta_H = 9.75 \times 10/(10+H) + 7.24 \times H/(10+H)$$

$$\delta_D = 9.75 \times 10/(10+D) + 23.43 \times D/(10+D)$$

Note that, the molecular volumes (mL/mol) of the solvents are 74.4 (acetone), 130.3 (n-hexane), and 18 (deionized water), and the SP values of the solvents are 9.75 (acetone), 7.24 (n-hexane), and 23.43 (deionized water). Moreover, the unit of the obtained SP value of the resin is $(cal/cm^3)^{1/2}$.

—Urethane Resin—

The urethane resin is preferably an anionic self-emulsifying urethane resin in view of dispersion stability. In view of film formation, strength, and bendability when the post-treatment liquid is applied onto an image forming area, the urethane resin is more preferably an anionic self-emulsifying ether-based urethane resin.

The acid value of the urethane resin is preferably 10 mgKOH/g to 100 mgKOH/g, more preferably 25 mgKOH/g to 80 mgKOH/g. When the acid value is 10 mgKOH/g or greater, significant aggregations do not occur, and a uniform film can be formed. When the acid value is 100 mgKOH/g or less, inclusion of an excessive amount of water can be prevented, and thus an abrasion resistance of a resulting image can be improved, as well as forming a uniform film. Note that, the acid value is a value of potassium hydroxide in milligrams, which is required for neutralizing free fatty acid or other acidic materials contained in 1 g of oil or fat, such as oil, fat, and wax. The acid value can be calculated by measuring a mass of an oil or fat sample according an acid value of the oil or fat, dissolving the sample in a neutralized benzene alcohol solution, and titrating with an alcoholic potassium hydroxide solution using phenolphthalein as an indicator, and can be measured in accordance with JIS K 0070-1992.

The SP value of the urethane resin is preferably 6 $(cal/cm^3)^{1/2}$ to 34 $(cal/cm^3)^{1/2}$, more preferably 8 $(cal/cm^3)^{1/2}$ to 23 $(cal/cm^3)^{1/2}$.

The glass transition temperature of the urethane resin is preferably −50° C. to 150° C., more preferably −10° C. to 30° C. When the glass transition temperature is −50° C. or higher, a hardness of a coating film is appropriate, and thus abrasion resistance of a resulting image is not impaired from an excessively soft coating film. When the glass transition temperature is 150° C. or lower, a sufficient abrasion resistance of a resulting image can be attained. Note that, the glass transition temperature can be measured by differential scanning calorimetry (DSC), or thermal mechanical analysis (TMA).

The minimum film forming temperature (MFT) of the urethane resin is preferably 25° C. or lower. When the minimum film forming temperature (MFT) is 25° C. or lower, adhesion of the formed image to fibers of a recording medium is automatically carried out without heating or drying the recording medium. Note that, the minimum film forming temperature is the lowest temperature at which a transparent continuous film is formed, when a polymer emulsion, which is obtained by dispersing urethane resin particles in water, is thinly flow casted onto a metal plate, such as aluminium, with increasing temperature.

As for the urethane resin, a commercial product can be used. Examples of the commercial product include: PERMARIN series manufactured by Sanyo Chemical Industries, Ltd.; W5661 and XW-75-W932 manufactured by Mitsui Chemicals, Inc.; and SF460S manufactured by NUC Corporation. Moreover, a material, in which an aqueous urethane resin and an acrylic resin are copolymerized in the form of a graft copolymer, such as WEM-3000 manufactured by Taisei Fine Chemical Co., Ltd., can be used. These may be used alone, or in combination.

—Acrylic Resin—

Among the acrylic resin, an acryl silicone resin is preferable in view of the strength, especially when the post-treatment liquid is applied to an image forming area, and glossiness of a resulting image.

The SP value of the acrylic resin is preferably 6 $(cal/cm^3)^{1/2}$ to 34 $(cal/cm^3)^{1/2}$, more preferably 8 $(cal/cm^3)^{1/2}$ to 23 $(cal/cm^3)^{1/2}$.

As for the acrylic resin, a commercial product can be used. Examples of the commercial product of the acrylic resin include: KP-543, KP-545, and KP-549 manufactured by Shin-Etsu Chemical Co., Ltd.; and AQ-914, AQ-ASi-91, and AQ-4790 manufactured by Daicel FineChem Ltd. These may be used alone, or in combination.

An amount of the resin relative to the total amount of the post-treatment liquid is preferably 10% by mass to 40% by mass, more preferably 20% by mass to 30% by mass.

<<Wax>>

The wax is added for the purpose of imparting lubricity to an imaging area.

In view of film formability, and lubricity, examples of the wax include polyethylene wax and carnauba wax. These may be used alone, or in combination.

The melting point of the wax is preferably 80° C. to 140° C., more preferably 100° C. to 140° C. When the melting point of the wax is 80° C. or higher, the wax rarely melts excessively or solidifies in the room temperature environment, and thus storage stability of the post-treatment liquid can be maintained. When the melting point of the wax is 140° C. or lower, the wax is sufficiently melted in the room temperature environment, and lubricity of the post-treatment liquid can be improved.

The volume average particle diameter of the wax is preferably 0.01 μm or greater, more preferably 0.01 μm to 0.1 μm. When the volume average particle diameter is 0.01 μm or greater, wax particles tend to align at a surface of the post-treatment liquid to impart lubricity to the post-treatment liquid. Note that, the volume average particle diameter can be measured, for example, by means of a particle size distribution measuring device (product name: Microtrac UPA, manufactured by NIKKISO CO., LTD.).

As for the polyethylene wax, a commercial product can be used. Examples of the commercial product include High-Tech series manufactured by TOHO Chemical Industry Co., Ltd., and AQUACER series manufactured by BYK Japan K.K. These may be used alone, or in combination.

As for the carnauba wax, a commercial product can be used. Examples of the commercial product include Selosol 524, and Trasol CN, manufactured by CHUKYO YUSHI CO., LTD. These may be used alone, or in combination.

An amount of the wax relative to the total amount of the post-treatment liquid is preferably 1% by mass to 10% by mass, more preferably 1% by mass to 5% by mass.

<<Self-Crosslinking Resin>>

The self-crosslinking resin is added to form a crosslink structure between the aqueous ink and the post-treatment liquid.

Examples of the self-crosslinking resin include a heat-reactive resin.

Examples of the heat-reactive resin include a self-crosslinking resin containing an isocyanate group. The isocyanate group-containing self-crosslinking resin is a heat-reactive resin including a block isocyanate group in a urethane skeleton. The block site bonded to the isocyanate group is released with heat, to form an active isocyanate group. The active isocyanate groups induce a self crosslinking reaction to thereby form a three-dimensional network structure. At the same time, the active isocyanate group reacts with the urethane resin in the post-treatment liquid to extend the chain of the three-dimensional network structure, to thereby form the denser three-dimensional network structure.

The isocyanate group in the self-crosslinking resin included in the post-treatment liquid is activated by applying heat to perform drying after the application of the post-treatment liquid, to crosslink the self-crosslinking resin and the urethane resin. As a result, a three-dimensional network structure can be formed. Accordingly, the post-treatment liquid rarely penetrates into the image, even when the post-treatment liquid is applied onto a surface of an image in an unfixed state, which is formed by jetting the aqueous ink, a uniform coating film can be formed on the surface of the aqueous ink, and therefore glossiness of the image, and an abrasion resistance of the image can be improved.

As for the isocyanate group-containing self-crosslinking resin, a commercial product can be used. Examples of the commercial product of the isocyanate group-containing self-crosslinking resin include ERSATRON series manufactured by DKS Co., Ltd.

A three-dimensional network structure similar to the structure mentioned above can be formed by adding, other than the self-crosslinking resin, a crosslinking agent, which reacts with the carboxyl group-containing resin in the aqueous ink through a cross-linking reaction, to the post-treatment liquid.

In view of reactivity, examples of the crosslinking agent include a water-soluble oxazoline group-containing polymer, and a carbodiimide group-containing polymer. These may be used alone, or in combination.

Examples of the water-soluble oxazoline group-containing polymer include an oxazoline group-containing resin, and particles on surfaces of which oxazoline groups are adsorbed.

As for the oxazoline group-containing resin, a commercial product can be used. Examples of the commercial product include K-2000 series, WA series, RPS series, and RAS series manufactured by NIPPON SHOKUBAI CO., LTD. These may be used alone, or in combination.

The particles on surfaces of which oxazoline groups are adsorbed may be organic particles, or inorganic particles. As for the organic particles, a commercial product can be used. Examples of the commercial product of the organic particles include ME series manufactured by Soken Chemical & Engineering Co., Ltd., JURYMER MB series manufactured by TOAGOSEI CO., LTD., TOSPEARL series manufactured by Momentive Performance Materials Inc., Microgel series manufactured by NIPPONPAINT Co., Ltd., and Fluon series manufactured by ASAHI GLASS CO., LTD. These may be used alone, or in combination. As for the inorganic particles, a commercial product can be used. Examples of the commercial product of the inorganic particles include Titania series manufactured by Idemitsu Kosan Co., Ltd., and Aluminium Oxide C manufactured by NIPPON AEROSIL CO., LTD. These may be used alone, or in combination.

As for the carbodiimide group-containing polymer, a commercial product can be used. Examples of the commercial product include CARBODILITE series manufactured by Nisshinbo Chemical Inc.

An amount of the self-crosslinking resin relative to the total amount of the post-treatment liquid is preferably 1% by mass to 10% by mass, more preferably 2% by mass to 4% by mass. When the amount of the self-crosslinking resin is 1% by mass or greater, glossiness of a resulting image and abrasion resistance of the image can be improved owing to a cross-linking reaction. When the amount of the self-crosslinking resin is 10% by mass or less, the viscosity of the post-treatment liquid can be appropriately adjusted, and ejection stability of the post-treatment liquid from a recording head can be improved.

<<Other Ingredients>>

The aforementioned other ingredients are not particularly limited as long as the ingredients can be used in the post-treatment liquid. Examples of the ingredients include a surfactant, an antifoaming agent, a pH regulator, an antifungal agent, and an anti-rust agent.

—Surfactant—

The surfactant is added for the purpose of reducing the surface tension of the post-treatment liquid.

As the post-treatment liquid contains the surfactant, the post-treatment liquid appropriately wets a recording medium to increase the penetration speed of the post-treatment liquid into the recording medium. As a result, an abrasion resistance of a resulting image can be improved, and a problem, such as bleeding, can be prevented.

Examples of the surfactant include a fluoroalkyl group-containing surfactant. Examples of the fluoroalkyl group-containing surfactant include the compound represented by the following formula (i), polyoxyalkylene alkyl ether, and a polyether-modified siloxane copolymer.

$$C_4F_9-CH_2CH(OH)CH_2O-(CH_2CH_2O)_8-CH_2CH(OH)CH_2-C_4F_9 \quad \text{Formula (i)}$$

Note that, the compound represented by the formula (i) above does not include perfluorooctane sulfonate (PFOS) and perfluorooctanoic acid (PFOA), and therefore the compound represented by the formula (i) is excellent in view of no concern regarding possible environmental pollution.

As for the compound represented by the formula (i), a commercial product can be used. Examples of the commercial product include UNIDYNE DSN-403N (product name, manufactured by DAIKIN INDUSTRIES, Ltd.).

An amount of the surfactant relative to the total amount of the post-treatment liquid is preferably 0.01% by mass to 4% by mass, more preferably 0.1% by mass to 1% by mass. When the amount of the surfactant is 0.01% by mass or greater, an effect obtainable by adding the surfactant can be sufficiently exhibited. When the amount of the surfactant is 4% by mass or less, permeation to a recording medium is appropriately maintained, and a problem, such as a strike-through, which is caused by excessive permeation, can be prevented.

—Antifoaming Agent—

As for the antifoaming agent, the same antifoaming agent used in the aqueous ink can be used.

—pH Regulator—

As for the pH regulator, the same pH regulator used in the aqueous ink can be used.

<<Recording Medium>>

The recording medium is appropriately selected depending on the intended purpose without any limitation. For example, plain paper, gloss paper, special paper, cloth, a film, an OHP sheet, or general-purpose printing paper can be suitably used as the recording medium.

(Ink Cartridge)

The cartridge is a container housing the post-treatment liquid and the aqueous ink. The cartridge may further contain appropriately selected other members, if necessary.

The container is not particularly limited, and a shape, structure size, and material of the container are appropriately selected depending on the intended purpose. Examples of the container include a plastic container, and an ink bag formed of an aluminium laminate film.

Figure 5:
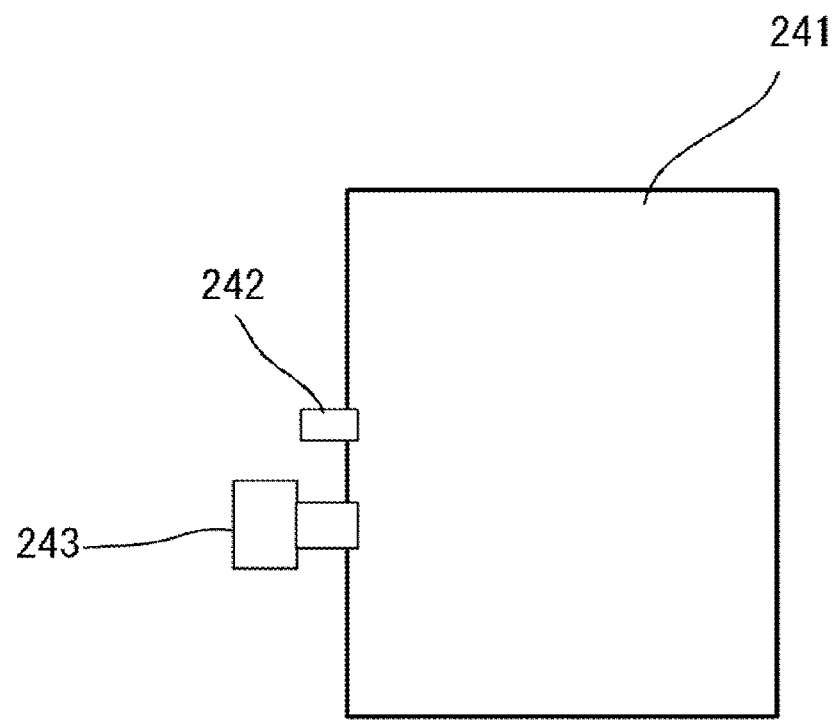
FIG. 5 is a view illustrating one example of an ink cartridge used in the image forming apparatus for use in the present invention.
Figure 6:
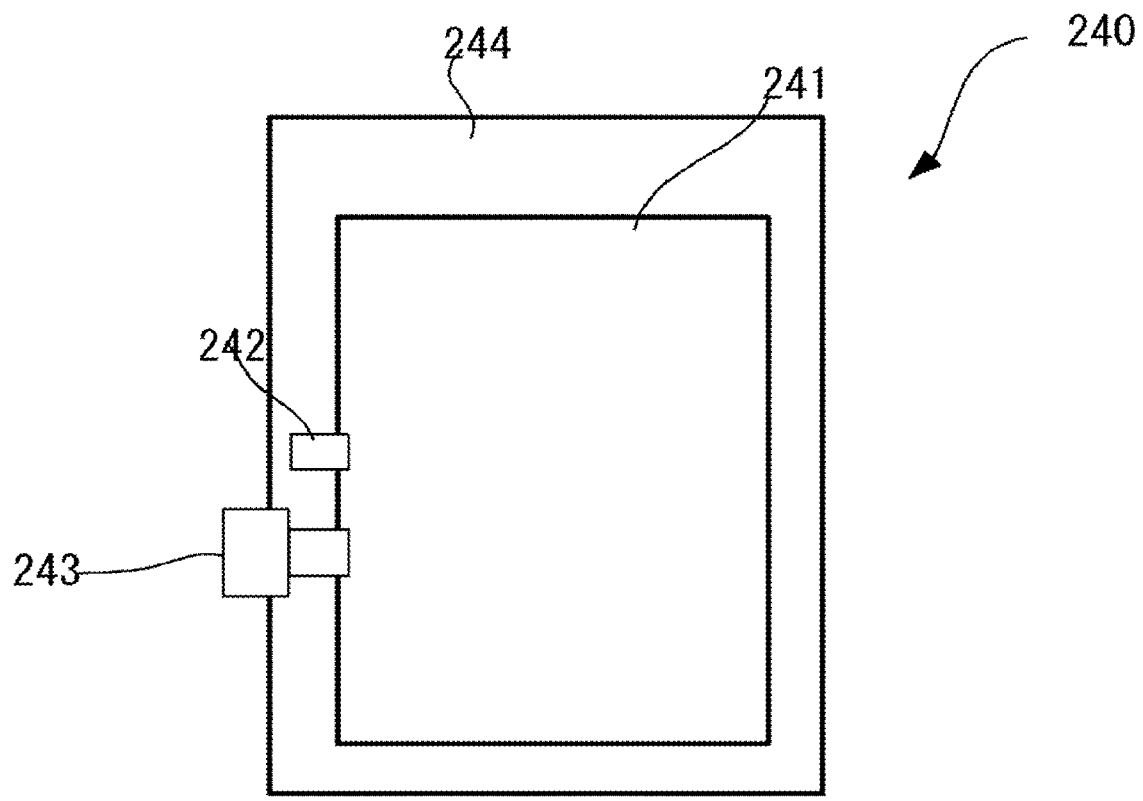
FIG. 6 is a view illustrating the ink cartridge of FIG. 5 including a case (an external housing).

The ink cartridge is described with reference to FIGS. 5 and 6 next. FIG. 5 is a diagram illustrating one example of the ink cartridge of the present invention. FIG. 6 is a diagram of the ink cartridge of FIG. 5 including a case (exterior housing).

As illustrated in FIG. 5, the ink is inserted into an ink bag 241 from an ink inlet 242. After releasing air from the ink bag, the ink bag is closed by fusing the ink inlet 242. At the time of use, a needle attached to the main body of the device is inserted into an ink outlet 243 formed of a rubber member to supply the ink to the device. The ink bag 241 is formed of a wrapping member, such as an air non-permeable aluminum laminate film. As illustrated in FIG. 6, the ink bag 241 is typically housed in a plastic cartridge case 244, which is then detachably mounted as an ink cartridge 240 in an image forming apparatus.

By charging the ink cartridge 240 with the treatment liquid instead of the ink and using the cartridge as a cartridge for a treatment liquid, such the cartridge can be used by detachably mounting in various image forming apparatuses, similarly to the ink cartridge.

(Image Forming Method and Image Forming Apparatus)

The image forming method includes: applying stimuli to jet the aqueous ink onto a recording medium to record an image (image forming step); and applying a post-treatment liquid onto a surface of the recording medium, on which the aqueous ink has been jetted (post-treatment step).

The image forming apparatus includes an image forming unit configured to apply stimuli to jet the aqueous ink to a recording medium to record an image, and a post-treatment liquid configured to apply a post-treatment liquid onto a surface of the recording medium, on which the aqueous ink has been jetted.

<Image Forming Step and Image Forming Unit>

The image forming step includes applying stimuli to the aqueous ink to jet the aqueous ink to form an image.

The image forming unit is a unit configured to apply stimuli to the aqueous ink to jet the aqueous ink to form an image.

The stimuli is appropriately selected depending on the intended purpose without any limitation. Examples of the stimulus include heat (temperature), pressure, vibrations, and light. These may be used alone, or in combination. Among them, heat and pressure are preferable.

Examples of an embodiment of ink jetting used for the image forming set include: a so-called piezo system, where ink droplets are ejected by changing an internal volume of an ink channel through deformation of a vibration plate constituting a wall surface of the ink channel using a piezoelectric element as a pressure generating unit configured to press the ink in the ink channel (for example, see JP-A No. 02-51734); a so-called thermal system, where the ink is heated within the ink channel using a heating element to generate air bubbles (for example, see JP-A No. 61-59911); and an electrostatic system, where the vibration plate constituting the wall surface of the ink channel and an electrode are disposed to face each other, the vibration plate is deformed with an electrostatic force generated between the vibration plate and the electrode to change the internal volume of the ink channel to thereby eject ink droplets (for example, see JP-A No. 06-71882).

For example, the size of the ejected ink droplet is preferably 3 pL to 40 pL. The jetting speed is preferably 5 m/s to 20 m/s. The drive frequency is preferably 1 kHz or greater. The resolution is preferably 300 dpi or greater.

<Treatment Liquid Coating Unit and Treatment Liquid Coating Step>

The treatment liquid coating step is not particularly limited, provided that the step contains an application method, with which a post-treatment liquid is uniformly applied on a surface where the aqueous ink has been jetted.

The treatment liquid coating unit is not particularly limited, provided that the unit contains an application unit, with which a post-treatment liquid is uniformly applied on a surface where the aqueous ink has been jetted.

Examples of the application method include inkjet coating, blade coating, gravure coating, gravure offset coating, bar coating, roller coating, knife coating, air knife coating, comma coating, U-comma coating, AKKU coating, smoothing coating, microgravure coating, reverse roll coating, four-roller or five-roller coating, dip coating, curtain coating, slide coating, and die coating.

Glossiness of an image can be improved by performing the post-treatment coating step or using the post-treatment unit on the image formed by jetting the aqueous ink, a surface of which is sufficiently fixed, or unfixed. Note that, the treated recording medium is preferably subjected to a drying step with a drying unit, if necessary. As for the drying step with the drying unit, the recording medium can be dried with a roll heater, a drum heater, or hot air.

The temperature for the drying can be changed depending on a type or amount of the water-soluble organic solvent contained in the aqueous ink, and the minimum film forming temperature of the resin emulsion to be added. Moreover, the temperature can be changed depending on a type of a recording medium for use.

The temperature for the drying is preferably high in view of drying performance and a film forming temperature. The temperature is more preferably 40° C. to 120° C., particularly preferably 50° C. to 90° C. When the heating temperature is in the range of 40° C. to 120° C., a recording medium is prevented from being damaged by heat, and ejection failures, which may be caused by a heated ink head, can be prevented.

The deposition amount of the post-treatment liquid on the recording medium on wet basis in the post-treatment step is preferably 0.1 g/m$^2$ to 30.0 g/m$^2$, more preferably 0.2 g/m$^2$ to 10.0 g/m$^2$. When the wet deposition amount is 0.1 g/m$^2$ or greater, image quality (image density, chroma, color bleeding, blur characters, and white missing portions) can be improved. When the wet deposition amount is 30.0 g/m$^2$ or less, plain paper is prevented from impairing the textures, and curling of paper can be prevented.

The image forming apparatus includes an image forming unit configured to jet an aqueous ink onto a surface of a recording medium to form an image, a storage unit configured to store a post-treatment liquid, and a post-treatment unit configured to treat a surface of the aqueous ink after the image formation performed by the image forming unit. Moreover, the image forming unit includes at least an ink applying unit, and optionally includes other units, such as a stimuli generating unit, and a controlling unit.

A schematic view (explanatory side plane view) illustrating one example of the image forming apparatus of the present invention is depicted in FIG. 1.

The image forming apparatus 101 is equipped with head units 110K, 110C, 110M, and 110Y, in each of which heads for jetting an aqueous ink are accumulated, a heat unit 151 configured to jet a post-treatment liquid, maintenance units 111K, 111C, 111M, and 111Y each corresponding to each heat unit to perform a maintenance of heads, a maintenance unit (not illustrated), ink cartridges 107K, 107C, 107M, and 107Y each configured to supply the ink, a post-treatment liquid cartridge (not illustrated), ink subtanks 108K, 108C, 108M, and 108Y each configured to store part of the ink from the cartridge and supply the ink to the head with an appropriate pressure, and a post-treatment liquid subtank.

Moreover, the image forming apparatus 101 includes a paper ejection system containing a convey belt 113 configured to convey a recording medium 114 with adsorbing the recording medium 114 using a suction fan 120, conveying rollers 119 and 121 configured to support the convey belt 113, a tension roller 115 configured to keep the appropriate tension of the convey belt 113, a platen 124 and platen roller 118 configured to maintain an appropriate flatness of the convey belt 113, a charging roller 116 configured to impart electrostatic charging used to adsorb the recording medium 114, a paper ejection roller 117 configured to press the recording medium 114, and a paper ejection tray 104 configured to stock the ejected recording media 114, and a paper feeding system containing a paper feeding tray 103 configured to stock recording media 114 to be printed, separation pads 112 and 122 configured to send the recording media 114 one by one from the paper feeding tray, a counter roller 123 configured to securely adsorb the sent recording medium 114 with the charging belt, and a manual feed tray 105 used in the case where paper is fed manually.

Furthermore, the image forming apparatus 101 may further include a waste liquid tank 109 configured to collect a waste liquid discharged after maintenance, and a control panel 106 capable of controlling the apparatus, and displaying the state of the apparatus.

Nozzle arrays of each head unit are aligned to be orthogonal to the conveyance direction of the recording medium 114, and are formed to be longer than a length of a recording region. The recording media 114 from the paper feeding tray are separated one by one by the separation roller, and the separated recording medium is adhered on the conveyance belt, as it is closely adhered onto the conveyance belt with the press roller. When the recording medium is passed below the head unit, droplets are jetted onto the recording medium to pattern the recording medium with the droplets at high speed. The resulting recording medium is separated from the conveyance belt with the separation claw, and the recorded matter is ejected to the paper ejection tray by supported by the paper ejection rollers. Note that, the head units of the aqueous ink and the heat unit of the post-treatment liquid are disposed adjacent to each other, and thus the post-treatment liquid is ejected on the surface of the aqueous ink within 1 second to 3 seconds from the ejection of the aqueous ink.

Moreover, the recording medium, on which the post-treatment liquid and the aqueous ink have been deposited, is heated by a hot air fan 150, and thus the drying is accelerated to thereby improve an abrasion resistance of the image. Note that, the drying step is performed by the hot air fan on the recording medium after the recording, but the drying step may be performed on the recording medium before or after recording. Moreover, the drying system is not limited to the hot air fan, and any of other units, such as a heating roller, may be used, or the units may be used in combination.

Figure 3:
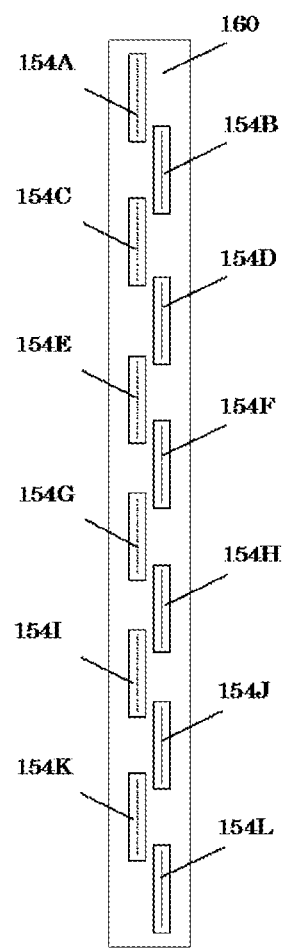
FIG. 3 is a schematic view illustrating a head array in a head unit in the image forming apparatus for use in the present invention.

FIG. 3 is a schematic view illustrating one example of a head alignment in the head unit of the image forming apparatus.

The heat unit includes heads 154A to 154L secured on a head circumferential member 160, and the heads are arranged in a manner that part of nozzles are overlapped.

Figure 4:
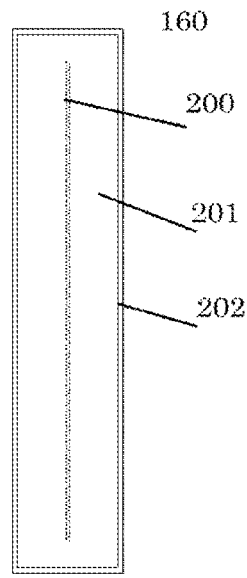
FIG. 4 is a schematic view illustrating one of the heads aligned in the heat unit of FIG. 3.

FIG. 4 is a schematic view illustrating each head aligned in the head unit of FIG. 3. In the head, a nozzle 200 is disposed in a nozzle plate 201, and a space between the head and the head circumferential member is sealed with a filler 202 to eliminate any gap at the nozzle surface side.

Figure 2:
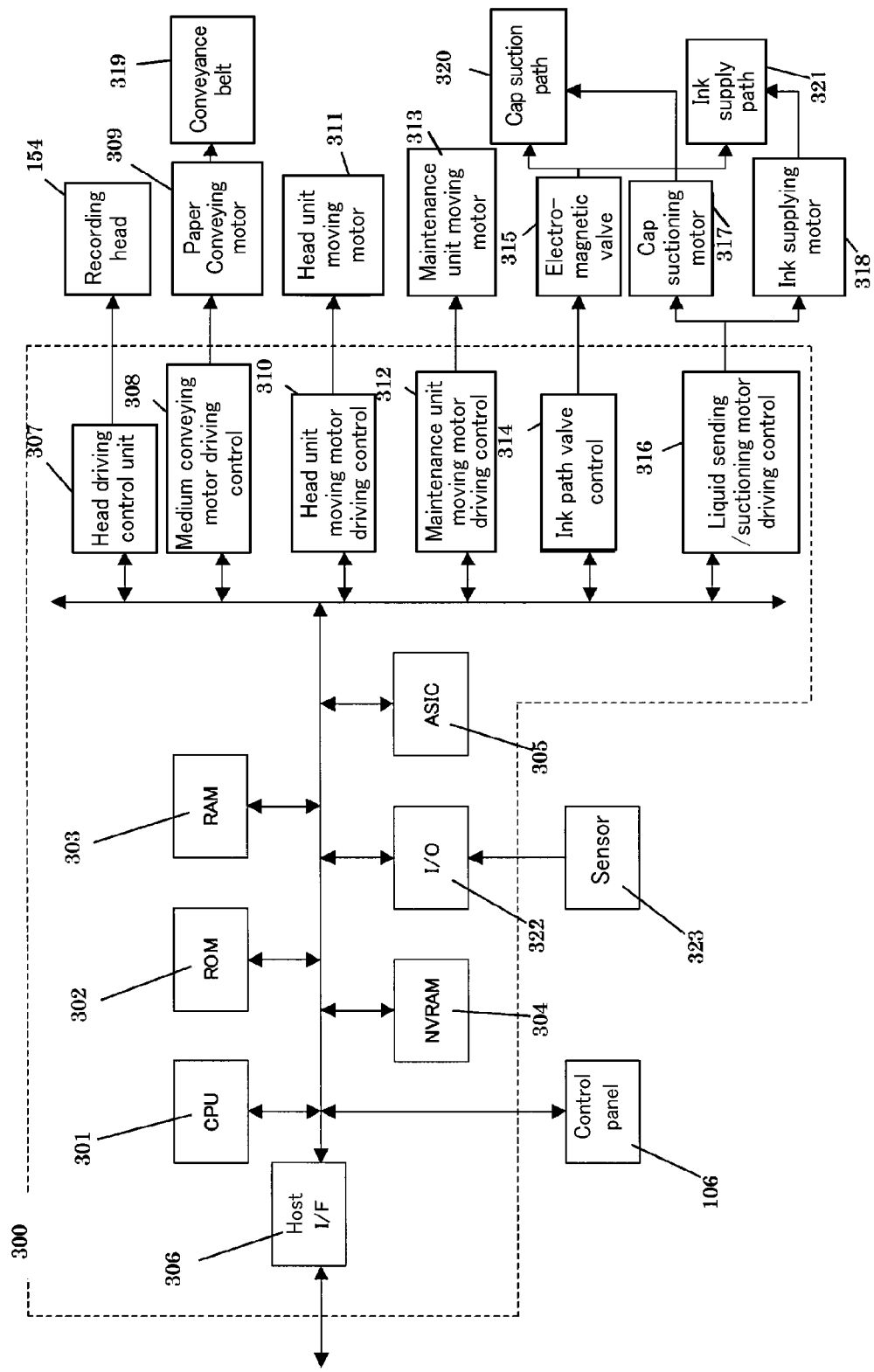
FIG. 2 is a schematic block diagram of the control unit in FIG. 1.

Next, the outline of the control unit of the image forming apparatus of FIG. 1 is described with reference to FIG. 2. Note that, FIG. 2 is a schematic block explanatory diagram of the control unit of FIG. 1.

The control unit 300 is equipped with CPU 301 configured to control the entire apparatus, ROM 302 configured to store a program executed by CPU 301, a degree of staining of the nozzle surface relative to ejection of the predetermined ink used in the present invention, a threshold value for the staining degree of the nozzle surface, data for a driving wave, and other fixed data, RAM 303 configured to temporarily store image data, a nonvolatile memory (NVRAM) 304 configured to keep the data white a power source of the apparatus is shut out, and ASIC 305 configured to process various signals relative to the image data, image processing, such as replacing positions of images, and processing other input and output signals for controlling the entire apparatus.

Moreover, the control unit 300 contains: a host I/F 306 for sending and receiving data and signals to and from a host; a head drive controlling unit 307 for generating a drive wave for driving and controlling a pressure generating unit of the recording head 154; a recording medium conveying motor driving unit 308 for driving a recording medium conveying motor 309; a head unit moving motor drive controlling unit 312 for driving a head unit (carriage) moving motor 311; an ink channel valve controlling unit 314 for controlling opening and closing of an electromagnetic valve 315 of an ink channel; a delivery/suction motor drive controlling unit 316 for controlling driving of a cap suction motor 317 or ink supplying motor 318; and I/O 322 for inputting detecting signals from an encoder which outputs a detecting signal corresponding to a traveling amount and speed of the conveyance belt 113, detecting signals from a sensor 323 for detecting temperature and humidity environment (or can be either of them), detecting signals on the ink level of each subtank, and detecting signals from various sensors not shown in the diagram. The control unit 300 is connected to a control panel 106 to or on which information necessary to the device is input or displayed.

The control unit 300 receives at the host I/F 306 printing data and the like from a host via a cable or net, and in this case the host is such as an information-processing device (e.g., a personal computer), an image scanning device (e.g., an image scanner), and an imaging device (e.g., a digital camera).

CPU 301 reads out printing data into a receiving buffer contained in the host I/F 306 and analyzes the data, optionally makes the data to image-processed or repositioned by ASIC 305, synchronizes the image data (i.e. dot pattern data) which equivalent of one page for a head width of the recording head 154 with respect to a clock signal, and output the signal to the head drive controlling unit 307. Note that, the formation of the dot pattern data for image output may be stored as font data in, for example, ROM 302. Alternatively, the image data may be expanded to bit map data by a printer driver at the host side, and the bit map data may be output to the device.

The head drive controlling unit 307 selectively applies voltage to a pressure generating unit of the recording head 154 based on the image data (i.e., the dot pattern data) for one page of the recording head 154 input per page, and drives the recording head 154.

EXAMPLES

Examples and comparative examples of the present invention are described hereinafter, but the examples shall not be construed as to limit the scope of the present invention. Note that, in the tables below, a unit of an SP value is "(cal/cm$^3$)$^{1/2}$," and the unit "%" for amounts of ingredients of the aqueous ink and the post-treatment liquid denotes "% by mass."

Example 1

<Aqueous Ink>
<<Preparation of Anionic Group-Containing Styrene/Acryl Copolymer>>

A reaction vessel of an automatic polymerization reaction device (polymerization tester DSL-2AS, available from Todoroki Sangyo Co., Ltd.), which had the reaction vessel equipped with a stirrer, a dripping device, a thermosensor, and a nitrogen inlet device provided at the upper side of the vessel, was charged with 550 g of methyl ethyl ketone, and the internal atmosphere of the reaction vessel was replaced with nitrogen gas with stirring. After heating to 80° C. while maintaining the internal atmosphere of the reaction vessel as the nitrogen atmosphere, a mixed solution of 75.0 g of 2-hydroxyethyl methacrylate, 77.0 g of methacrylic acid, 80.0 g of styrene, 150.0 g of butyl methacrylate, 98.0 g of butyl acrylate, 20.0 g of methyl methacrylate, and 40.0 g of PERBUTYL® O (manufactured by NOF CORPORATION) was added dropwise by the dripping device over 4 hours. After the completion of dripping, the reaction mixture was further allowed to react at the same temperature for 15 hours, to thereby obtain a methyl ethyl ketone solution of an anionic group-containing styrene-acryl copolymer A having an acid value of 100 (measured by the method specified in JIS K 0070-1992), the weight average molecular weight of 21,000 (measured by means of D5280 LCS M-PDA, manufactured by Shimadzu Corporation), and glass transition temperature of 31° C. (measured by means of STA7200, manufactured by Hitachi High-Tech Science Corporation). After the reaction, part of methyl ethyl ketone was removed under the reduced pressure to adjust the non-volatile component content thereof to 50%. In this manner, the anionic group-containing styrene/acryl copolymer A solution.

<<Preparation of Aqueous Pigment Dispersion Elements>>

A mixing chamber equipped with a cooling jacket was charged with 800 g of carbon black (product name: Raven 1080, manufactured by Columbian Chemicals Co.), 200 g of the anionic group-containing styrene/acryl copolymer A solution, 143 g of a 10% sodium hydroxide aqueous solution, 100 g of methyl ethyl ketone, and 1,957 g of water, and the resulting mixture was mixed through stirring. The resulting mixture was passed through a disperser (product name: SC Mill SC 100, manufactured by Nippon Coke & Engineering Co., Ltd.) filled with zirconia beads having diameters of 0.3 mm, to disperse the mixture in a circulation system (a system where the dispersion liquid from the disperser was returned to the mixing chamber) for 6 hours. During this operation, the rotation number of the disperser was set at 2,700 rpm, and cold water was passed through the cooling jacket to maintain the temperature of the dispersion liquid to 40° C. or lower. After dispersing, the resulting dispersion liquid was taken out from the mixing chamber, followed by washing the mixing chamber and the flow paths of the disperser with 10,000 g of water. This washing water was then combined with the dispersion liquid to thereby obtain a diluted dispersion liquid. The diluted dispersion liquid was placed in a glass distillation apparatus to remove the entire volume of methyl ethyl ketone, and part of water. After cooling the dispersion liquid to room temperature, 10% hydrochloric acid was added dropwise with stirring to adjust the pH to 4.5. Thereafter, the solids were collected through filtration performed by a Nutsche filtration device, and the resultant was washed with water. The resulting cake was collected in a container, and 200 g of a 20% by mass potassium hydroxide aqueous solution was added to the cake, followed by dispersing the mixture by a disperser (product name: TK Homodisperser, manufactured by PRIMIX Corporation). To the resulting dispersion liquid, water was added to adjust the non-volatile component, to thereby obtain aqueous pigment dispersion elements having the non-volatile component content of 20% dispersed in an aqueous medium, as composite particles, in which the carbon black was coated with the carboxyl group-containing styrene/acryl copolymer.

<<Preparation of Aqueous Ink 1>>

A rosin-modified maleic acid resin (carboxyl group-containing resin) in the amount of 2.0 g, 20.0 g of glycerin (water-soluble organic solvent, SP value: 16.38 $(cal/cm^3)^{1/2}$), 10.0 g of 1,3-butanediol (water-soluble organic solvent, SP value: 12.75 $(cal/cm^3)^{1/2}$), 0.4 g of the compound represented by the formula (i) (fluorosurfactant), 0.2 g of 2-amino-2-ethyl-1,3-propanediol (pH regulator), 0.1 g of benzotriazole (antifungal anti-rust agent), and 58.1 g of water (SP value: 23.4 $(cal/cm^3)^{1/2}$) were homogeneously mixed with stirring for 1 hour. To the resulting mixture, 1.2 g of N-octyl-2-pyrrolidone (antifoaming agent) was added, and the resultant was homogeneously mixed with stirring for 1 hour. Thereafter, the aqueous pigment dispersed element in the amount of 8.0 g based on solid content conversion was added, and the resulting mixture was homogeneously mixed through stirring for 1 hour. The obtained mixture was filtered through a polyvinylidene fluoride membrane filter having the average pore diameter of 0.8 μm under pressure to remove coarse particles or dusts, to thereby obtain Aqueous Ink 1. The composition of Aqueous Ink 1, and the amounts of the ingredients of Aqueous Ink 1 are presented in Table 1.

Note that, the volume average particle diameter of the colorant for use in the present invention was measured by means of Microtrac UPA-150 manufactured by NIKKISO CO., LTD., using a sample, prepared by diluting the measuring sample to have a solid content (mass concentration) of 0.01. The volume average particle diameter of the colorant as measured was 120 nm.

TABLE 1

| | | Aqueous Ink 1 |
|---|---|---|
| Colorant | Carbon black (Dv: 120 nm) | 8 |
| Carboxyl group-containing resin | Rosin-modified maleic resin | 2 |
| Water-soluble organic solvent | Glycerin (SP value: 16.38) | 20 |
| | 1,3-Butanediol (SP value: 12.75) | 10 |
| Surfactant | Surfactant of formula (i) | 0.4 |
| Antifoaming agent | N-Octyl-2-pyrrolidone | 1.2 |
| PH Regulator | 2-amino-2-ethyl-1,3-propanediol | 0.2 |
| Antifungal agent | Benzotriazole | 0.1 |
| Water | Ion-exchanged water (SP value: 23.4) | 58.1 |
| | Total (% by mass) | 100 |
| | SP value of mixed solution in aqueous ink $((cal/cm^3)^{1/2})$ | 20.6 |

<Post-Treatment Liquid>
—Preparation 1 of Post-Treatment Liquid—

Post-Treatment Liquid A for use in Example 1 was obtained by homogeneously mixing 2.5 g of Water-Soluble Organic Solvent A (glycerin, SP value: 16.38 $(cal/cm^3)^{1/2}$), 27.5 g of Water-Soluble Organic Solvent B (3-methoxy-1-butanol, SP value: 9.98 $(cal/cm^3)^{1/2}$), 30.0 g of Ether-Based Urethane Resin A (product name: PERMARIN UA00, manufactured by Sanyo Chemical Industries, Ltd., volume average particle diameter: 400 nm), 5.0 g of Polyethylene-Based Wax Emulsion B (product name: NOPCOAT PEM-17, manufactured by SAN NOPCO LIMITED, melting point: 105° C.), 2.0 g of an isocyanate group-containing resin (product name: ERSATRON E-37, manufactured by DKS Co., Ltd.), 0.4 g of the compound represented by the formula (i), 2.0 g of N-octyl-2-pyrrolidone, 2.0 g of octane diol, 0.2 g of 2-amino-2-ethyl-1,3-propanediol, 0.1 g of benzotriazole, and 29.1 g of ion-exchanged water (SP value: 23.4 $(cal/cm^3)^{1/2}$) with stirring for 1 hour.

An image forming set was provided using Aqueous Ink 1 and Post-Treatment Liquid A, as obtained.

Examples 2 to 29 and Comparative Examples 1 to 4

An ink set of each of Examples 2 to 29 and Comparative Examples 1 to 4, which included an aqueous ink and a post-treatment liquid, was provided in the same manner as in Example 1, provided that the compositions of the aqueous ink and post treatment liquid, and the amounts of the ingredients of the aqueous ink and post-treatment liquid were changed as depicted in Tables 2 to 8. The compositions and the amounts of the ingredients of Examples 1 to 29, and Comparative Examples 1 to 4 are presented in Tables 2 to 8.

<Image Forming Method>

Each of the aqueous inks of Examples 1 to 29 and Comparative Examples 1 to 4 was jetted on a recording medium (product name: OK Topcoat+, manufactured by Oji Paper Co., Ltd.) by means of an image forming apparatus (product name: IPSIO GXe5500, manufactured by Ricoh Company Limited), to form an unfixed square solid image having a size of 3 cm×3 cm, which was composed of a dot pattern. One and a half seconds later, the post-treatment liquid respectively used in Examples 1 to 29 or Comparative Examples 1 to 4 was jetted by the image forming apparatus onto a surface of the image formed by jetting the aqueous ink. Thereafter, the resulting image was dried with hot air and a drum heater at 90° C. for 2 minutes, to thereby obtain a fixing image. Note that, the drying was not performed in Example 29. Various properties of the image were evaluated in the following manners.

<<Glossiness of Image>>

A solid imaging part of the solid image having a size of 3 cm×3 cm, which was composed of a dot pattern, was measured by means of a chroma meter (product name: CR-400, manufactured by KONICA MINOLTA, INC.) to determine the image glossiness (60° gloss). The larger measurement value indicates the better glossiness of the image. When the image glossiness is 30% or greater, the resulting image can be used on practice without any problem.

<<Abrasion Resistance of Image>>

A solid imaging part of the solid image having a size of 3 cm×3 cm, which was composed of a dot pattern, was rubbed with a cloth attached onto a friction test device (product name: clock meter, manufactured by TOYO SEIKI SEISAKU-SHO, LTD.), and the transfer density of the ink on the cloth after rubbing was measured using a spectrodensitometer (product name: X-Rite939, manufactured by X-Rite). The lower the transfer density is, the more preferable the fixing ability of the image is. When the transfer density is less than 0.20, the resulting image can be used on practice without any problem.

<<Storage Stability>>

The post-treatment liquid of each of Examples 1 to 29 and Comparative Examples 1 to 4 was left to stand in a thermostat of 70° C. for 2 weeks. A difference (viscosity increase level) between the initial viscosity and the viscosity after the storage was measured, and the "storage stability" of the post-treatment liquid was evaluated based on the following evaluation criteria. When the result is evaluated as the "A," the post-treatment liquid can be used on practice without any problem. Note that, the initial viscosity and the viscosity after the storage were measured at 25° C. by means of TV-22 viscometer (manufactured by Toki Sangyo Co., Ltd.).

—Evaluation Criteria—
A: A difference between the initial viscosity and the viscosity after the storage was within ±5%.
B: A difference between the initial viscosity and the viscosity after the storage was greater than the ±5% range, but within ±10%.
C: A difference between the initial viscosity and the viscosity after the storage was greater than the ±10% range.

<<Ejection Stability>>

After printing a solid imaging part of the solid image having a size of 3 cm×3 cm, the recording head was left for 30 minutes without being protected with a cap. Thereafter, the same image was again recorded, and the number of nozzles from which the ink was not ejected was measured. The result was evaluated as "ejection stability" based on the following evaluation criteria. When the result is evaluated as the "B" or better, the ink can be used on practice without any problem.

—Evaluation Criteria—
A: There was no nozzle from which the ink was not ejected.
B: The number of nozzles from which the ink was not ejected was less than 5.
C: The number of nozzles from which the ink was not ejected was 5 or more.

TABLE 2

| | | | Example | | | | |
|---|---|---|---|---|---|---|---|
| | | | 1 | 2 | 3 | 4 | 5 |
| aqueous ink | | type of aqueous ink | 1 | 1 | 1 | 1 | 1 |
| | | SP value of glycerin $((cal/cm^3)^{1/2})$ | 16.4 | 16.4 | 16.4 | 16.4 | 16.4 |
| | | SP value of 1,3-butanediol $((cal/cm^3)^{1/2})$ | 12.8 | 12.8 | 12.8 | 12.8 | 12.8 |
| | | SP value of mixed solution in aqueous ink $((cal/cm^3)^{1/2})$ | 20.6 | 20.6 | 20.6 | 20.6 | 20.6 |
| post-treatment liquid | water-soluble organic solvent | water-soluble organic solvent A (SP value: 16.4) | 2.5 | 2.5 | 2.5 | 2.5 | 2.5 |
| | | water-soluble organic solvent B (SP value: 10.0) | 27.5 | 27.5 | — | — | — |
| | | water-soluble organic solvent C (SP value: 8.9) | — | — | 28 | 42.5 | — |
| | | water-soluble organic solvent D (SP value: 9.8) | — | — | — | — | 27.5 |
| | urethane resin | ether-based urethane resin A (volume average particle diameter (Dv): 400 nm, SP value: 10) | 30 | 15 | 15 | 15 | 15 |
| | | ether-based urethane resin B(Dv: 84 nm SP value: 9.6) | — | 15 | 15 | 15 | 15 |
| | acrylic resin | acryl-silicone resin (Dv: 120 nm, SP value: 13) | — | — | — | — | — |
| | wax | polyethylene wax emulsion A(melting point (MP): 79° C.) | — | — | — | — | — |
| | | polyethylene wax emulsion B (MP: 105° C.) | 5 | 5 | 5 | 5 | 5 |
| | crosslinking agent | isocyanate group-containing resin | 2 | 2 | 2 | 2 | 2 |
| | surfactant | surfactant of formula (i) | 0.4 | 0.4 | 0.4 | 0.4 | 0.4 |
| | antifoaming agent | N-octyl-2-pyrrolidone | 1.2 | 1.2 | 1.2 | 1.2 | 1.2 |
| | penetrating agent | octane diol | 2 | 2 | 2 | 2 | 2 |
| | pH regulator | 2-amino-2-ethyl-1,3-propanediol | 0.2 | 0.2 | 0.2 | 0.2 | 0.2 |
| | antifungal agent | benzotriazole | 0.1 | 0.1 | 0.1 | 0.1 | 0.1 |
| | water | ion-exchanged water (SP value: 23.4) | 29.1 | 29.1 | 28.6 | 14.1 | 29.1 |
| | | total (% by mass) | 100 | 100 | 100 | 100 | 100 |
| | | SP value (I) $((cal/cm^3)^{1/2})$ | 10 | 10 | 10 | 10 | 10 |
| | | SP value (II) $((cal/cm^3)^{1/2})$ | 16.9 | 16.9 | 16.2 | 12.7 | 16.8 |
| | | difference between SP value (I) and SP value (II) (minimum value) | 6.9 | 6.9 | 6.2 | 2.7 | 6.8 |
| | | difference of SP value of mixed solution in post-treatment liquid to SP value of mixed solution in aqueous ink | −3.7 | −3.7 | −4.4 | −7.9 | −3.8 |
| evaluation results | | drying | yes | yes | yes | yes | yes |
| | | image glossiness (%) | 48 | 62 | 65 | 70 | 63 |
| | | abrasion resistance of image | 0.2 | 0.1 | 0.1 | 0.2 | 0.1 |
| | | storage stability | A | A | A | A | A |
| | | ejection stability | A | A | A | B | A |

TABLE 3

| | | | Example | | | | |
|---|---|---|---|---|---|---|---|
| | | | 6 | 7 | 8 | 9 | 10 |
| aqueous ink | | type of aqueous ink | 1 | 1 | 1 | 1 | 1 |
| | | SP value of glycerin $((cal/cm^3)^{1/2})$ | 16.4 | 16.4 | 16.4 | 16.4 | 16.4 |
| | | SP value of 1,3-butanediol $((cal/cm^3)^{1/2})$ | 12.8 | 12.8 | 12.8 | 12.8 | 12.8 |
| | | SP value of mixed solution in aqueous ink $((cal/cm^3)^{1/2})$ | 20.6 | 20.6 | 20.6 | 20.6 | 20.6 |
| post-treatment liquid | water-soluble organic solvent | water-soluble organic solvent A(SP value: 16.4) | 2.5 | 2.5 | 2.5 | 2.5 | 2.5 |
| | | water-soluble organic solvent E(SP value: 9.4) | 27.5 | — | — | — | — |
| | | water-soluble organic solvent F(SP value: 9.8) | — | 27.5 | — | — | — |
| | | water-soluble organic solvent G(SP value: 7.8) | — | — | 29 | — | — |
| | | water-soluble organic solvent H(SP value: 8.1) | — | — | — | 28.5 | — |
| | | water-soluble organic solvent I (SP value: 7.4) | — | — | — | — | 29 |
| | urethane resin | ether-based urethane resin A(Dv: 400 nm, SP value: 10) | 15 | 15 | 15 | 15 | 15 |
| | | ether-based urethane resin B(Dv: 84 nm, SP value: 9.6) | 15 | 15 | 15 | 15 | 15 |
| | acrylic resin | acryl-silicone resin (Dv: 120 nm, SP value: 13) | — | — | — | — | — |
| | wax | polyethylene wax emulsion B(MP: 105° C.) | 5 | 5 | 5 | 5 | 5 |
| | crosslinking agent | isocyanate group-containing resin | 2 | 2 | 2 | 2 | 2 |
| | surfactant | surfactant of formula (i) | 0.4 | 0.4 | 0.4 | 0.4 | 0.4 |

TABLE 3-continued

|  |  | Example | | | | |
|---|---|---|---|---|---|---|
|  |  | 6 | 7 | 8 | 9 | 10 |
| antifoaming agent | N-octyl-2-pyrrolidone | 1.2 | 1.2 | 1.2 | 1.2 | 1.2 |
| penetrating agent | octane diol | 2 | 2 | 2 | 2 | 2 |
| pH regulator | 2-amino-2-ethyl-1,3-propanediol | 0.2 | 0.2 | 0.2 | 0.2 | 0.2 |
| antifungal agent | benzotriazole | 0.1 | 0.1 | 0.1 | 0.1 | 0.1 |
| water | ion-exchanged water (SP value: 23.4) | 29.1 | 29.1 | 27.6 | 28.1 | 27.6 |
|  | total (% by mass) | 100 | 100 | 100 | 100 | 100 |
|  | SP value (I) ((cal/cm$^3$)$^{1/2}$) | 10 | 10 | 10 | 10 | 10 |
|  | SP value (II) ((cal/cm$^3$)$^{1/2}$) | 16.6 | 16.8 | 15.5 | 15.7 | 15.3 |
|  | difference between SP value (I) and SP value (II) (minimum value) | 6.6 | 6.8 | 5.5 | 5.7 | 5.3 |
|  | difference of SP value of mixed solution in post-treatment liquid to SP value of mixed solution in aqueous ink | −4.0 | −3.8 | −5.1 | −4.9 | −5.3 |
| evaluation results | drying | yes | yes | yes | yes | yes |
|  | image glossiness (%) | 63 | 62 | 68 | 64 | 67 |
|  | abrasion resistance of image | 0.1 | 0.1 | 0.1 | 0.1 | 0.1 |
|  | storage stability | A | A | A | A | A |
|  | ejection stability | A | A | A | A | A |

TABLE 4

|  |  |  | Example | | | | |
|---|---|---|---|---|---|---|---|
|  |  |  | 11 | 12 | 13 | 14 | 15 |
| aqueous ink |  | type of aqueous ink | 1 | 1 | 1 | 1 | 1 |
|  |  | SP value of glycerin ((cal/cm$^3$)$^{1/2}$) | 16.4 | 16.4 | 16.4 | 16.4 | 16.4 |
|  |  | SP value of 1,3-butanediol ((cal/cm$^3$)$^{1/2}$) | 12.8 | 12.8 | 12.8 | 12.8 | 12.8 |
|  |  | SP value of mixed solution in aqueous ink ((cal/cm$^3$)$^{1/2}$) | 20.6 | 20.6 | 20.6 | 20.6 | 20.6 |
| post-treatment liquid | water-soluble organic solvent | water-soluble organic solvent A(SP value: 16.4) | 2.5 | 2.5 | 2.5 | 2.5 | 2.5 |
|  |  | water-soluble organic solvent B(SP value: 10.0) | 27.5 | 27.5 | 27.5 | 27.5 | 27.5 |
|  |  | water-soluble organic solvent C(SP value: 8.9) | — | — | — | — | — |
|  | urethane resin | ether-based urethane resin A(Dv: 400 nm, SP value: 10) | 15 | 15 | — | 2.5 | 5 |
|  |  | ether-based urethane resin B(Dv: 84 nm, SP value: 9.6) | — | — | — | 2.5 | 5 |
|  |  | ether-based urethane resin C(Dv: 11 nm, SP value: 11.1) | 15 | — | — | — | — |
|  |  | ether-based urethane resin D(Dv: 8 nm, SP value: 19.1) | — | 15 | — | — | — |
|  | acrylic resin | acryl-silicone resin (Dv: 120 nm, SP value: 13) | — | — | 30 | — | — |
|  | wax | polyethylene wax emulsion A(MP: 79° C.) | — | — | — | — | — |
|  |  | polyethylene wax emulsion B(MP: 105° C.) | 5 | 5 | 5 | 5 | 5 |
|  | crosslinking agent | isocyanate group-containing resin | 2 | 2 | 2 | 2 | 2 |
|  | surfactant | surfactant of formula (i) | 0.4 | 0.4 | 0.4 | 0.4 | 0.4 |
|  | antifoaming agent | N-octyl-2-pyrrolidone | 1.2 | 1.2 | 1.2 | 1.2 | 1.2 |
|  | penetrating agent | octane diol | 2 | 2 | 2 | 2 | 2 |
|  | pH regulator | 2-amino-2-ethyl-1,3-propanediol | 0.2 | 0.2 | 0.2 | 0.2 | 0.2 |
|  | antifungal agent | benzotriazole | 0.1 | 0.1 | 0.1 | 0.1 | 0.1 |
|  | water | ion-exchanged water (SP value: 23.4) | 29.1 | 29.1 | 29.1 | 54.1 | 49.1 |
|  |  | total (% by mass) | 100 | 100 | 100 | 100 | 100 |
|  |  | SP value (I) ((cal/cm$^3$)$^{1/2}$) | 11 | 19.1 | 13 | 10 | 10 |
|  |  | SP value (II) ((cal/cm$^3$)$^{1/2}$) | 16.9 | 16.9 | 16.9 | 18.8 | 18.5 |
|  |  | difference between SP value (I) and SP value (II) (minimum value) | 5.8 | 2.2 | 3.9 | 8.8 | 8.5 |
|  |  | difference of SP value of mixed solution in post-treatment liquid to SP value of mixed solution in aqueous ink | −3.7 | −3.7 | −3.7 | −1.8 | −2.1 |
| evaluation results |  | drying | yes | yes | yes | yes | yes |
|  |  | image glossiness (%) | 68 | 70 | 73 | 35 | 58 |
|  |  | abrasion resistance of image | 0.1 | 0.1 | 0.1 | 0.3 | 0.1 |
|  |  | storage stability | A | A | A | A | A |
|  |  | ejection stability | A | A | A | A | A |

TABLE 5

| | | Example | | | | |
|---|---|---|---|---|---|---|
| | | 16 | 17 | 18 | 19 | 20 |
| aqueous ink | type of aqueous ink | 1 | 1 | 1 | 1 | 1 |
| | SP value of glycerin ((cal/cm$^3$)$^{1/2}$) | 16.4 | 16.4 | 16.4 | 16.4 | 16.4 |
| | SP value of 1,3-butanediol ((cal/cm$^3$)$^{1/2}$) | 12.8 | 12.8 | 12.8 | 12.8 | 12.8 |
| | SP value of mixed solution in aqueous ink ((cal/cm$^3$)$^{1/2}$) | 20.6 | 20.6 | 20.6 | 20.6 | 20.6 |
| post-treatment liquid | water-soluble organic solvent | water-soluble organic solvent A(SP value: 16.4) | 2.5 | 2.5 | 2.5 | 2.5 | 2.5 |
| | | water-soluble organic solvent B(SP value: 10.0) | 27.5 | 27.5 | 27.5 | 27.5 | 27.5 |
| | urethane resin | ether-based urethane resin A(Dv: 400 nm, SP value: 10) | 20 | 22.5 | 15 | 15 | 15 |
| | | ether-based urethane resin B(Dv: 84 nm, SP value: 9.6) | 20 | 22.5 | 15 | 15 | 15 |
| | acrylic resin | acryl-silicone resin (Dv: 120 nm, SP value: 13) | — | — | — | — | — |
| | wax | polyethylene wax emulsion A(MP: 79° C.) | — | — | 5 | — | — |
| | | polyethylene wax emulsion B(MP: 105° C.) | 5 | 5 | — | — | — |
| | | polyethylene wax emulsion C(MP: 137° C.) | — | — | — | 5 | — |
| | | carnauba wax(MP: 83° C.) | — | — | — | — | 5 |
| | crosslinking agent | isocyanate group-containing resin | 2 | 2 | 2 | 2 | 2 |
| | surfactant | surfactant of formula (i) | 0.4 | 0.4 | 0.4 | 0.4 | 0.4 |
| | antifoaming agent | N-oetyl-2-pyrrolidone | 1.2 | 1.2 | 1.2 | 1.2 | 1.2 |
| | penetrating agent | octane diol | 2 | 2 | 2 | 2 | 2 |
| | pH regulator | 2-amino-2-ethyl-1,3-propanediol | 0.2 | 0.2 | 0.2 | 0.2 | 0.2 |
| | antifungal agent | benzotriazole | 0.1 | 0.1 | 0.1 | 0.1 | 0.1 |
| | water | ion-exchanged water (SP value: 23.4) | 19.1 | 14.1 | 29.1 | 29.1 | 29.1 |
| | | total (% by mass) | 100 | 100 | 100 | 100 | 100 |
| | | SP value (I) ((cal/cm$^3$)$^{1/2}$) | 10 | 10 | 10 | 10 | 10 |
| | | SP value (II) ((cal/cm$^3$)$^{1/2}$) | 15.5 | 14.6 | 16.9 | 16.9 | 16.9 |
| | | difference between SP value (I) and SP value (II) (minimum value) | 5.5 | 4.6 | 6.9 | 6.9 | 6.9 |
| | | difference of SP value of mixed solution in post-treatment liquid to SP value of mixed solution in aqueous ink | −5.1 | −6.0 | −3.7 | −3.7 | −3.7 |
| evaluation results | | drying | yes | yes | yes | yes | yes |
| | | image glossiness (%) | 66 | 64 | 58 | 62 | 60 |
| | | abrasion resistance of image | 0.1 | 0.1 | 0.1 | 0.1 | 0.1 |
| | | storage stability | A | B | B | A | A |
| | | ejection stability | B | B | B | A | A |

TABLE 6

| | | Example | | | | |
|---|---|---|---|---|---|---|
| | | 21 | 22 | 23 | 24 | 25 |
| aqueous ink | type of aqueous ink | 1 | 1 | 1 | 1 | 1 |
| | SP value of glycerin ((cal/cm$^3$)$^{1/2}$) | 16.4 | 16.4 | 16.4 | 16.4 | 16.4 |
| | SP value of 1,3-butanediol ((cal/cm$^3$)$^{1/2}$) | 12.8 | 12.8 | 12.8 | 12.8 | 12.8 |
| | SP value of mixed solution in aqueous ink ((cal/cm$^3$)$^{1/2}$) | 20.6 | 20.6 | 20.6 | 20.6 | 20.6 |
| post-treatment liquid | water-soluble organic solvent | water-soluble organic solvent A(SP value: 16.4) | 2.5 | 2.5 | 2.5 | 2.5 | 2.5 |
| | | water-soluble organic solvent B(SP value: 10.0) | 27.5 | 27.5 | 27.5 | 27.5 | 27.5 |
| | urethane resin | ether-based urethane resin A(Dv: 400 nm, SP value: 10) | 15 | 15 | 15 | 15 | 15 |
| | | ether-based urethane resin B(Dv: 84 nm, SP value: 9.6) | 15 | 15 | 15 | 15 | 15 |
| | | ether-based urethane resin C(Dv: 11 nm, SP value: 11.1) | — | — | — | — | — |
| | | ether-based urethane resin D(Dv: 8 nm, SP value: 19.1) | — | — | — | — | — |
| | acrylic resin | acryl-silicone resin (Dv: 120 nm, SP value: 13) | — | — | — | — | — |
| | wax | polyethylene wax emulsion A(MP: 79° C.) | — | — | — | — | — |
| | | polyethylene wax emulsion B(MP: 105° C.) | 0.5 | 1 | 10 | 12.5 | 5 |
| | crosslinking agent | isocyanate group-containing resin | 2 | 2 | 2 | 2 | 0.5 |
| | surfactant | surfactant of formula (i) | 0.4 | 0.4 | 0.4 | 0.4 | 0.4 |
| | antifoaming agent | N-octyl-2-pyrrolidone | 1.2 | 1.2 | 1.2 | 1.2 | 1.2 |
| | penetrating agent | octane diol | 2 | 2 | 2 | 2 | 2 |
| | pH regulator | 2-amino-2-ethyl-1,3-propanediol | 0.2 | 0.2 | 0.2 | 0.2 | 0.2 |
| | antifungal agent | benzotriazole | 0.1 | 0.1 | 0.1 | 0.1 | 0.1 |
| | water | ion-exchanged water (SP value: 23.4) | 33.6 | 33.1 | 24.1 | 21.6 | 30.6 |
| | | total (% by mass) | 100 | 100 | 100 | 100 | 100 |
| | | SP value (I) ((cal/cm$^3$)$^{1/2}$) | 10 | 10 | 10 | 10 | 10 |
| | | SP value (II) ((cal/cm$^3$)$^{1/2}$) | 17.3 | 17.3 | 16.3 | 15.9 | 17 |
| | | difference between SP value (I) and SP value (II) (minimum value) | 7.3 | 7.3 | 6.3 | 5.9 | 7 |
| | | difference of SP value of mixed solution in post-treatment liquid to SP value of mixed solution in aqueous ink | −3.3 | −3.3 | −4.3 | −4.7 | −3.6 |
| | | drying | yes | yes | yes | yes | yes |

TABLE 6-continued

|  |  | Example |  |  |  |  |
|---|---|---|---|---|---|---|
|  |  | 21 | 22 | 23 | 24 | 25 |
| evaluation results | image glossiness (%) | 49 | 59 | 64 | 62 | 54 |
|  | abrasion resistance of image | 0.2 | 0.1 | 0.1 | 0.1 | 0.2 |
|  | storage stability | A | A | A | B | A |
|  | ejection stability | A | A | A | B | A |

TABLE 7

|  |  |  | Example | | | |
|---|---|---|---|---|---|---|
|  |  |  | 26 | 27 | 28 | 29 |
| aqueous ink |  | type of aqueous ink | 1 | 1 | 1 | 1 |
|  |  | SP value of glycerin ((cal/cm$^3$)$^{1/2}$) | 16.4 | 16.4 | 16.4 | 16.4 |
|  |  | SP value of 1,3-butanediol ((cal/cm$^3$)$^{1/2}$) | 12.8 | 12.8 | 12.8 | 12.8 |
|  |  | SP value of mixed solution in aqueous ink ((cal/cm$^3$)$^{1/2}$) | 20.6 | 20.6 | 20.6 | 20.6 |
| post-treatment liquid | water-soluble organic solvent | water-soluble organic solvent A(SP value: 16.4) | 2.5 | 2.5 | 2.5 | 2.5 |
|  |  | water-soluble organic solvent B(SP value: 10.0) | 27.5 | 27.5 | 27.5 | 27.5 |
|  | urethane resin | ether-based urethane resin A(Dv: 400 nm, SP value: 10) | 15 | 15 | 15 | 15 |
|  |  | ether-based urethane resin B(Dv: 84 nm, SP value: 9.6) | 15 | 15 | 15 | 15 |
|  | acrylic resin | acryl-silicone resin (Dv: 120 nm, SP value: 13) | — | — | — | — |
|  | wax | polyethylene wax emulsion A(MP: 79° C.) | — | — | — | — |
|  |  | polyethylene wax emulsion B(MP: 105° C.) | 5 | 5 | 5 | 5 |
|  | crosslinking agent | isocyanate group-containing resin | 1 | 10 | 12.5 | 2 |
|  | surfactant | surfactant of formula (i) | 0.4 | 0.4 | 0.4 | 0.4 |
|  | antifoaming agent | N-octyl-2-pyrrolidone | 1.2 | 1.2 | 1.2 | 1.2 |
|  | penetrating agent | octane diol | 2 | 2 | 2 | 2 |
|  | pH regulator | 2-amino-2-ethyl-1,3-propanediol | 0.2 | 0.2 | 0.2 | 0.2 |
|  | antifungal agent | benzotriazole | 0.1 | 0.1 | 0.1 | 0.1 |
|  | water | ion-exchanged water (SP value: 23.4) | 30.1 | 21.1 | 18.6 | 29.1 |
|  |  | total (% by mass) | 100 | 100 | 100 | 100 |
|  |  | SP value (I) ((cal/cm$^3$)$^{1/2}$) | 10 | 10 | 10 | 10 |
|  |  | SP value (II) ((cal/cm$^3$)$^{1/2}$) | 17 | 15.8 | 15.5 | 16.9 |
|  |  | difference between SP value (I) and SP value (II) (minimum value) | 7 | 5.8 | 5.5 | 6.9 |
|  |  | difference of SP value of mixed solution in post-treatment liquid to SP value of mixed solution in aqueous ink | −3.6 | −4.8 | −5.1 | −3.7 |
|  |  | drying | yes | yes | yes | no |
| evaluation results |  | image glossiness (%) | 60 | 61 | 63 | 42 |
|  |  | abrasion resistance of image | 0.1 | 0.1 | 0.1 | 0.2 |
|  |  | storage stability | A | A | B | A |
|  |  | ejection stability | A | A | B | A |

TABLE 8

|  |  |  | Comp Ex. | | | |
|---|---|---|---|---|---|---|
|  |  |  | 1 | 2 | 3 | 4 |
| aqueous ink |  | type of aqueous ink | 1 | 1 | 1 | 1 |
|  |  | SP value of glycerin ((cal/cm$^3$)$^{1/2}$) | 16.4 | 16.4 | 16.4 | 16.4 |
|  |  | SP value of 1,3-butanediol ((cal/cm$^3$)$^{1/2}$) | 12.8 | 12.8 | 12.8 | 12.8 |
|  |  | SP value of mixed solution in aqueous ink ((cal/cm$^3$)$^{1/2}$) | 20.6 | 20.6 | 20.6 | 20.6 |
| post-treatment liquid | water-soluble organic solvent | water-soluble organic solvent A(SP value: 16.4) | 2.5 | — | 30 | 2.5 |
|  |  | water-soluble organic solvent B(SP value: 10.0) | 27.5 | — | — | 12.5 |
|  | urethane resin | ether-based urethane resin A(Dv: 400 nm, SP value: 10) | — | 15 | 15 | 15 |
|  |  | ether-based urethane resin B(Dv: 84 nm, SP value: 9.6) | — | 15 | 15 | 15 |
|  |  | ether-based urethane resin C(Dv: 11 nm, SP value: 11.1) | — | — | — | — |
|  |  | ether-based urethane resin D(Dv: 8 nm, SP value: 19.1) | — | — | — | — |
|  | acrylic resin | acryl-silicone resin (Dv: 120 nm, SP value: 13) | — | — | — | — |
|  | wax | polyethylene wax emulsion A(MP: 79° C.) | — | — | — | — |
|  |  | polyethylene wax emulsion B(MP: 105° C.) | — | 5 | 5 | 5 |
|  | crosslinking agent | isocyanate group-containing resin | — | 2 | 2 | 2 |
|  | surfactant | surfactant of formula (i) | 0.4 | 0.4 | 0.4 | 0.4 |

TABLE 8-continued

|  |  | Comp Ex. | | | |
| --- | --- | --- | --- | --- | --- |
|  |  | 1 | 2 | 3 | 4 |
| antifoaming agent | N-octyl-2-pyrrolidone | 1.2 | 1.2 | 1.2 | 1.2 |
| penetrating agent | octane diol | 2 | 2 | 2 | 2 |
| pH regulator | 2-amino-2-ethyl-1,3-propanediol | 0.2 | 0.2 | 0.2 | 0.2 |
| antifungal agent | benzotriazole | 0.1 | 0.1 | 0.1 | 0.1 |
| water | ion-exchanged water (SP value: 23.4) | 66.1 | 59.1 | 29.1 | 44.1 |
|  | total (% by mass) | 100 | 100 | 100 | 100 |
|  | SP value (I) ((cal/cm$^3$)$^{1/2}$) | — | 10 | 10 | 10 |
|  | SP value (II) ((cal/cm$^3$)$^{1/2}$) | 19.4 | 23.4 | 19.8 | 20.3 |
|  | difference between SP value (I) and SP value (II) (minimum value) | — | 13.4 | 9.8 | 10.3 |
|  | difference of SP value of mixed solution in post-treatment liquid to SP value of mixed solution in aqueous ink | −1.2 | 2.8 | −0.8 | −0.3 |
|  | drying | yes | yes | yes | yes |
| evaluation results | image glossiness (%) | 15 | 21 | 18 | 28 |
|  | abrasion resistance of image | 0.3 | 0.2 | 0.2 | 0.2 |
|  | storage stability | A | C | A | B |
|  | ejection stability | A | C | A | B |

Note that, in Tables 2 to 8, the term "SP value (I)" is the SP value (I) of the urethane resin and/or acrylic resin in the post-treatment liquid, and means the SP value of at least one of the urethane resin or acrylic resin, which has the minimum difference between the SP value (I) and the SP value (II) of the mixed solution in the post-treatment liquid, in the case where two or more urethane resins are included, or the case where one or more urethane resins are included together with an acrylic resin.

Moreover, the details of the abbreviations in Tables 2 to 8 are as follows:
* Water-Soluble Organic Solvent A: glycerin (SP value: 16.38 (cal/cm$^3$)$^{1/2}$, manufactured by SAKAMOTO YAKUHIN KOGYO CO., LTD.)
* Water-Soluble Organic Solvent B: 3-methoxy-1-butanol (SP value: 9.98 (cal/cm$^3$)$^{1/2}$, manufactured by Tokyo Chemical Industry Co., Ltd.)
* Water-Soluble Organic Solvent C: 3-methoxy-3-methyl-1-butanol (SP value: 8.87 (cal/cm$^3$)$^{1/2}$, manufactured by Tokyo Chemical Industry Co., Ltd.)
* Water-Soluble Organic Solvent D: diethylene glycol monoisopropyl ether (SP value: 9.84 (cal/cm$^3$)$^{1/2}$, manufactured by Tokyo Chemical Industry Co., Ltd.)
* Water-Soluble Organic Solvent E: diethylene glycol monoisobutyl ether (SP value: 9.44 (cal/cm$^3$)$^{1/2}$, manufactured by Tokyo Chemical Industry Co., Ltd.)
* Water-Soluble Organic Solvent F: tripropylene glycol methyl ether (SP value: 9.77 (cal/cm$^3$)$^{1/2}$, manufactured by Tokyo Chemical Industry Co., Ltd.)
* Water-Soluble Organic Solvent G: the compound represented by the following formula (I) (SP value: 7.80 (cal/cm$^3$)$^{1/2}$, product name: HISOLVE MDPOM, manufactured by TOHO Chemical Industry Co., Ltd.)

$$CH_3O(CH_2CHCH_3O)_2CH_3 \qquad \text{Formula (I)}$$

* Water-Soluble Organic Solvent H: the compound represented by the following formula (II) (SP value: 8.10 (cal/cm$^3$)$^{1/2}$, product name: HISOLVE BDM, manufactured by TOHO Chemical Industry Co., Ltd.)

$$C_4H_9O(CH_2CH_2O)_2CH_3 \qquad \text{Formula (II)}$$

* Water-Soluble Organic Solvent I: the compound represented by the following formula (III) (SP value: 7.40 (cal/cm$^3$)$^{1/2}$, product name: HISOLVE MTPOM, manufactured by TOHO Chemical Industry Co., Ltd.)

$$CH_3O(CH_2CHCH_3O)_3CH_3 \qquad \text{Formula (III)}$$

* Ether-Based Urethane Resin A: product name: PERMARIN UA00 (manufactured by Sanyo Chemical Industries, Ltd., volume average particle diameter: 400 nm)
* Ether-Based Urethane Resin B: product name: SU-100N (manufactured by CHIRIKA Co., Ltd., volume average particle diameter: 84 nm)
* Ether-Based Urethane Resin C: product name: W5661 (manufactured by Mitsui Chemicals, Inc., volume average particle diameter: 11 nm)
* Ether-Based Urethane Resin D: product name: XW-75-W932 (manufactured by Mitsui Chemicals, Inc., volume average particle diameter: 8 nm)
* Acryl Silicone-Based Resin: product name: AQ914 (manufactured by Daicel FineChem Ltd., volume average particle diameter: 120 nm)
* Polyethylene-Based Wax Emulsion A: product name: NOPCOMARU MS-40 (manufactured by SAN NOPCO LIMITED, melting point: 79° C.)
* Polyethylene-Based Wax Emulsion B: product name: NOPCOAT PEM-17 (manufactured by SAN NOPCO LIMITED, melting point: 105° C.)
* Polyethylene-Based Wax Emulsion C: product name: High-Tech E-6314 (manufactured by TOHO Chemical Industry Co., Ltd., melting point: 137° C.)
* carnauba wax: product name: Selosol 524 (manufactured by CHUKYO YUSHI CO., LTD., melting point: 83° C.)
* isocyanate group-containing resin: product name: ERSATRON E-37, manufactured by DKS Co., Ltd.)
* fluorosurfactant: the compound represented by the following formula (i) (product name: UNIDYNE DSN-403N), manufactured by DAIKIN INDUSTRIES, Ltd.)

$$C_4F_9—CH_2CH(OH)CH_2O—(CH_2CH_2O)_8—CH_2CH(OH)CH_2—C_4F_9 \qquad \text{Formula (i)}$$

For example, the embodiments of the present invention are as follows:
<1> An image forming set including:
an aqueous ink including a colorant, a water-soluble organic solvent, and water; and
a post-treatment liquid including a water-soluble organic solvent, water, and at least one of a urethane resin and an acrylic resin, wherein a solubility parameter of a mixed solution of the water-soluble organic solvent and the water in the post-treatment liquid is lower than a solubility parameter of a mixed solution of the water-soluble organic solvent and the water in the aqueous ink by 1.5 $(cal/cm^3)^{1/2}$ or greater.

<2> The image forming set according to <1>, wherein the solubility parameter of the mixed solution of the water-soluble organic solvent and the water in the post-treatment liquid is lower than the solubility parameter of the mixed solution of the water-soluble organic solvent and the water in the aqueous ink by 7.5 $(cal/cm^3)^{1/2}$ or less.

<3> The image forming set according to <1> or <2>, wherein a difference between a solubility parameter of the at least one of the urethane resin and the acrylic resin in the post-treatment liquid, and the solubility parameter of the mixed solution of the water-soluble organic solvent and the water in the post-treatment liquid is 4 $(cal/cm^3)^{1/2}$ or less.

<4> The image forming set according to any one of <1> to <3>, wherein the water-soluble organic solvent in the post-treatment liquid is at least one selected from the group consisting of 3-methoxy-1-butanol, 3-methoxy-3-methyl-1-butanol, diethylene glycol monoisopropyl ether, diethylene glycol monoisobutyl ether, tripropylene glycol methyl ether, 1-methoxy-2-propanol, a compound represented by the following formula (I), a compound represented by the following formula (II), and a compound represented by the following formula (III):

$$CH_3O(CH_2CHCH_3O)_2CH_3 \quad \text{Formula (I)}$$

$$C_4H_9O(CH_2CH_2O)_2CH_3 \quad \text{Formula (II)}$$

$$CH_3O(CH_2CHCH_3O)_3CH_3 \quad \text{Formula (III) and}$$

an amount of the water-soluble organic solvent in the post-treatment liquid is 20% by mass to 40% by mass relative to a total amount of the post-treatment liquid.

<5> The image forming set according to any one of <1> to <4>, wherein an amount of the at least one of the urethane resin and the acrylic resin in the post-treatment liquid is 10% by mass to 40% by mass relative to a total amount of the post-treatment liquid,
the urethane resin is an anionic self-emulsifying ether urethane resin, and
the acrylic resin is an acryl silicone resin.

<6> The image forming set according to any one of <1> to <5>, wherein the at least one of the urethane resin and the acrylic resin in the post-treatment liquid comprises at least two kinds of particles having different volume average particle diameters,
one of the at least two kinds of particles of the at least one of the urethane resin and the acrylic resin has a volume average particle diameter larger than a volume average particle diameter of the colorant in the aqueous ink, and
other of the at least two kinds of particles of the at least one of the urethane resin and the acrylic resin has a volume average particle diameter smaller than the volume average particle diameter of the colorant in the aqueous ink.

<7> The image forming set according to any one of <1> to <6>, wherein the post-treatment liquid further comprises wax having a melting point of 80° C. to 140° C., the wax comprising at least one of a polyethylene wax emulsion and carnauba wax, and
an amount of the wax is 1% by mass to 10% by mass relative to a total amount of the post-treatment liquid.

<8> The image forming set according to any one of <1> to <7>, the post-treatment liquid further includes a self-crosslinking resin configured to crosslink with the at least one of the urethane resin and the acrylic resin, the self-crosslinking resin being an isocyanate group-containing resin, and
an amount of the self-crosslinking resin is 1% by mass to 10% by mass relative to a total amount of the post-treatment liquid.

<9> The image forming set according to any one of <1> to <8>, wherein the aqueous ink further includes a fluorosurfactant.

<10> The image forming set according to any one of <1> to <9>, wherein the solubility parameter of the mixed solution of the water-soluble organic solvent and the water in the aqueous ink is 18 $(cal/cm^3)^{1/2}$ to 22 $(cal/cm^3)^{1/2}$.

<11> The image forming set according to any one of <1> to <10>, wherein the solubility parameter of the mixed solution of the water-soluble organic solvent and the water in the post-treatment liquid is 10 $(cal/cm^3)^{1/2}$ to 30 $(cal/cm^3)^{1/2}$.

<12> The image forming set according to any one of <1> to <11>, wherein the solubility parameter of the mixed solution of the water-soluble organic solvent and the water in the post-treatment liquid is lower than the solubility parameter of the mixed solution of the water-soluble organic solvent and the water in the aqueous ink by 3.0 $(cal/cm^3)^{1/2}$ to 5.0 $(cal/cm^3)^{1/2}$.

<13> The image forming set according to any one of <1> to <12>, wherein a mass ratio of an amount (% by mass) of the water-soluble organic solvent to an amount (% by mass) of the water in the mixed solution in the aqueous ink is 0.5 to 2.

<14> The image forming set according to any one of <1> to <13>, wherein a mass ratio of an amount (% by mass) of the water-soluble organic solvent to an amount (% by mass) of the water in the mixed solution in the post-treatment liquid is 0.5 to 2.

<15> The image forming set according to any one of <1> to <14>, wherein a minimum film forming temperature of the urethane resin is 25° C. or lower.

<16> The image forming set according to any one of <9> to <15>, wherein the fluorosurfactant is the compound represented by the following formula (i):

$$C_4F_9-CH_2CH(OH)CH_2O-(CH_2CH_2O)_8-CH_2CH(OH)CH_2-C_4F_9 \quad \text{Formula (i).}$$

<17> An image forming apparatus including:
the ink set according to any one of <1> to <16>;
an image forming unit configured to jet the aqueous ink to a recording medium to form an image; and
a post-treatment unit configured to apply the post-treatment liquid onto a surface of the recording medium, on which the aqueous ink has been jetted.

<18> The image forming apparatus according to <17>, further including a drying unit configured to dry the recording medium on which the post-treatment liquid has been applied by the post-treatment unit.

<19> An image forming method including: jetting the aqueous ink of the image forming set according to any one of <1> to <16> to a recording medium to form an image; and applying the post-treatment liquid of the image forming set onto a surface of the recording medium, on which the aqueous ink has been jetted.

<20> The image forming method according to <19>, wherein the post-treatment liquid is applied within 1 second to 3 seconds after the aqueous ink is jetted.

The image forming set according to any one of <1> to <16>, the image forming apparatus according to <17> or <18>, and the image forming method according to <19> or <20> solve the aforementioned various problems in the art, and achieve the following object. Specifically, the object is to provide an image forming set, an image forming apparatus, and an image forming method which can give glossiness to a resulting image.

This application claims priority to Japanese application No. 2014-259059, filed on Dec. 22, 2014 and incorporated herein by reference, and Japanese application No. 2015-091841, filed on Apr. 28, 2015 and incorporated herein by reference.

What is claimed is:

1. An image forming set, comprising:
an aqueous ink comprising a colorant, a water-soluble organic solvent, and water; and
a post-treatment liquid comprising a water-soluble organic solvent, water, and at least one of a urethane resin and an acrylic resin,
wherein a solubility parameter of a mixed solution of the water-soluble organic solvent and the water in the post-treatment liquid is lower than a solubility parameter of a mixed solution of the water-soluble organic solvent and the water in the aqueous ink by 2.1 (cal/cm$^3$)$^{1/2}$ or greater.

2. The image forming set according to claim 1, wherein the solubility parameter of the mixed solution of the water-soluble organic solvent and the water in the post-treatment liquid is lower than the solubility parameter of the mixed solution of the water-soluble organic solvent and the water in the aqueous ink by 7.5 (cal/cm$^3$)$^{1/2}$ or less.

3. The image forming set according to claim 1, wherein a difference between a solubility parameter of the at least one of the urethane resin and the acrylic resin in the post-treatment liquid, and the solubility parameter of the mixed solution of the water-soluble organic solvent and the water in the post-treatment liquid is 4 (cal/cm$^3$)$^{1/2}$ or less.

4. The image forming set according to claim 1, wherein the water-soluble organic solvent in the post-treatment liquid is at least one selected from the group consisting of 3-methoxy-1-butanol, 3-methoxy-3-methyl-1-butanol, diethylene glycol monoisopropyl ether, diethylene glycol monoisobutyl ether, tripropylene glycol methyl ether, 1-methoxy-2-propanol, a compound represented by the following formula (I), a compound represented by the following formula (II), and a compound represented by the following formula (III):

 Formula (I)

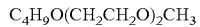 Formula (II)

 Formula (III), and an amount of the water-soluble organic solvent in the post-treatment liquid is 20% by mass to 40% by mass relative to a total amount of the post-treatment liquid.

5. The image forming set according to claim 1, wherein an amount of the at least one of the urethane resin and the acrylic resin in the post-treatment liquid is 10% by mass to 40% by mass relative to a total amount of the post-treatment liquid,
the urethane resin is an anionic self-emulsifying ether urethane resin, and
the acrylic resin is an acryl silicone resin.

6. The image forming set according to claim 1, wherein the at least one of the urethane resin and the acrylic resin in the post-treatment liquid comprises at least two kinds of particles having different volume average particle diameters, one of the at least two kinds of particles of the at least one of the urethane resin and the acrylic resin has a volume average particle diameter larger than a volume average particle diameter of the colorant in the aqueous ink, and
other of the at least two kinds of particles of the at least one of the urethane resin and the acrylic resin has a volume average particle diameter smaller than the volume average particle diameter of the colorant in the aqueous ink.

7. The image forming set according to claim 1, wherein the post-treatment liquid further comprises wax having a melting point of 80° C. to 140° C., the wax comprising at least one of a polyethylene wax emulsion and carnauba wax, and
an amount of the wax is 1% by mass to 10% by mass relative to a total amount of the post-treatment liquid.

8. The image forming set according to claim 1, the post-treatment liquid further comprises a self-crosslinking resin configured to crosslink with the at least one of the urethane resin and the acrylic resin, the self-crosslinking resin being an isocyanate group-containing resin, and
an amount of the self-crosslinking resin is 1% by mass to 10% by mass relative to a total amount of the post-treatment liquid.

9. The image forming set according to claim 1, wherein the aqueous ink further comprises a fluorosurfactant.

10. The image forming set according to claim 1, wherein the solubility parameter of the mixed solution of the water-soluble organic solvent and the water in the aqueous ink is 18 (cal/cm$^3$)$^{1/2}$ to 22 (cal/cm$^3$)$^{1/2}$.

11. The image forming set according to claim 1, wherein the solubility parameter of the mixed solution of the water-soluble organic solvent and the water in the post-treatment liquid is 10 (cal/cm$^3$)$^{1/2}$ to 30 (cal/cm$^3$)$^{1/2}$.

12. The image forming set according to claim 1, wherein the solubility parameter of the mixed solution of the water-soluble organic solvent and the water in the post-treatment liquid is lower than the solubility parameter of the mixed solution of the water-soluble organic solvent and the water in the aqueous ink by 3.0 (cal/cm$^3$)$^{1/2}$ to 5.0 (cal/cm$^3$)$^{1/2}$.

13. The image forming set according to claim 1, wherein a mass ratio of an amount (% by mass) of the water-soluble organic solvent to an amount (% by mass) of the water in the mixed solution in the aqueous ink is 0.5 to 2.

14. The image forming set according to claim 1, wherein a mass ratio of an amount (% by mass) of the water-soluble organic solvent to an amount (% by mass) of the water in the mixed solution in the post-treatment liquid is 0.5 to 2.

15. The image forming set according to claim 1, wherein a minimum film forming temperature of the urethane resin is 25° C. or lower.

16. The image forming set according to claim 1, wherein the aqueous ink further comprises a fluorosurfactant, the fluorosurfactant being the compound represented by the following formula (i):

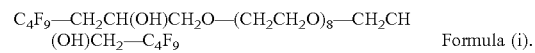 Formula (i).

17. An image forming apparatus comprising:
an ink set comprising an aqueous ink and a post-treatment liquid, the aqueous ink comprising a colorant, a water-soluble organic solvent, and water, and the post-treatment liquid comprising at least one of a urethane resin and an acrylic resin, a water-soluble organic solvent, and water;
an image forming unit configured to jet the aqueous ink to a recording medium to form an image; and
a post-treatment unit configured to apply the post-treatment liquid onto a surface of the recording medium, on which the aqueous ink has been jetted, wherein a solubility parameter of a mixed solution of the water-soluble organic solvent and the water in the post-treatment liquid is lower than a solubility parameter of a mixed solution of the water-soluble organic solvent and the water in the aqueous ink by 2.1 (cal/cm$^3$)$^{1/2}$ or greater.

18. The image forming apparatus according to claim 17, further comprising a drying unit configured to dry the recording medium on which the post-treatment liquid has been applied by the post-treatment unit.

19. An image forming method comprising:
jetting an aqueous ink to a recording medium to form an image, where the aqueous ink comprises a colorant, a water-soluble organic solvent, and water; and
applying a post-treatment liquid onto a surface of the recording medium, on which the aqueous ink has been jetted, where the post-treatment liquid comprises at least one of a urethane resin and an acrylic resin, a water-soluble organic solvent, and water,
wherein a solubility parameter of a mixed solution of the water-soluble organic solvent and the water in the post-treatment liquid is lower than a solubility parameter of a mixed solution of the water-soluble organic solvent and the water in the aqueous ink by 2.1 (cal/cm$^3$)$^{1/2}$ or greater.

20. The image forming method according to claim 19, wherein the post-treatment liquid is applied within 1 second to 3 seconds after the aqueous ink is jetted.

* * * * *